(12) United States Patent
Shirahige et al.

(10) Patent No.: US 7,246,204 B2
(45) Date of Patent: Jul. 17, 2007

(54) PRE-FETCH CONTROL DEVICE, DATA PROCESSING APPARATUS AND PRE-FETCH CONTROL METHOD

(75) Inventors: Yuji Shirahige, Kawasaki (JP); Tsuyoshi Motokurumada, Kawasaki (JP); Masaki Ukai, Kawasaki (JP); Aiichiro Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 204 days.

(21) Appl. No.: 10/368,751

(22) Filed: Feb. 20, 2003

(65) Prior Publication Data

US 2004/0003179 A1 Jan. 1, 2004

(30) Foreign Application Priority Data

Jun. 28, 2002 (JP) ............................. 2002-191464

(51) Int. Cl.
*G06F 12/00* (2006.01)
(52) U.S. Cl. ....................... 711/137; 711/217
(58) Field of Classification Search ................ 711/137, 711/119, 122, 138, 213, 217, 218, 220
See application file for complete search history.

(56) References Cited

U.S. PATENT DOCUMENTS

| 5,345,560 A | 9/1994 | Miura et al. |
| 5,412,786 A | 5/1995 | Kusano |
| 5,623,608 A * | 4/1997 | Ng ............................. 711/137 |
| 6,173,392 B1 | 1/2001 | Shinozaki |
| 6,748,463 B1 * | 6/2004 | Tsuboi et al. ................. 710/22 |
| 6,785,772 B2 * | 8/2004 | Venkumahanti et al. .... 711/137 |

FOREIGN PATENT DOCUMENTS

| JP | A-6-28180 | 2/1994 |
| JP | A-6-75853 | 3/1994 |
| JP | A-6-168119 | 6/1994 |
| JP | A-11-167520 | 6/1999 |

* cited by examiner

*Primary Examiner*—Brian R. Peugh
(74) *Attorney, Agent, or Firm*—Staas & Halsey LLP

(57) ABSTRACT

The present invention realizes pre-fetch based on a high-accuracy prediction. A plurality of address values are registered in advance in a pre-fetch address queue, based on previous memory accesses. If a request address from the processor unit of a request address register matches this address value, a pre-fetch address obtained by adding a block size to the request address is output to a secondary cache as a pre-fetch request. This pre-fetch address is written back into the pre-fetch address queue.

33 Claims, 24 Drawing Sheets

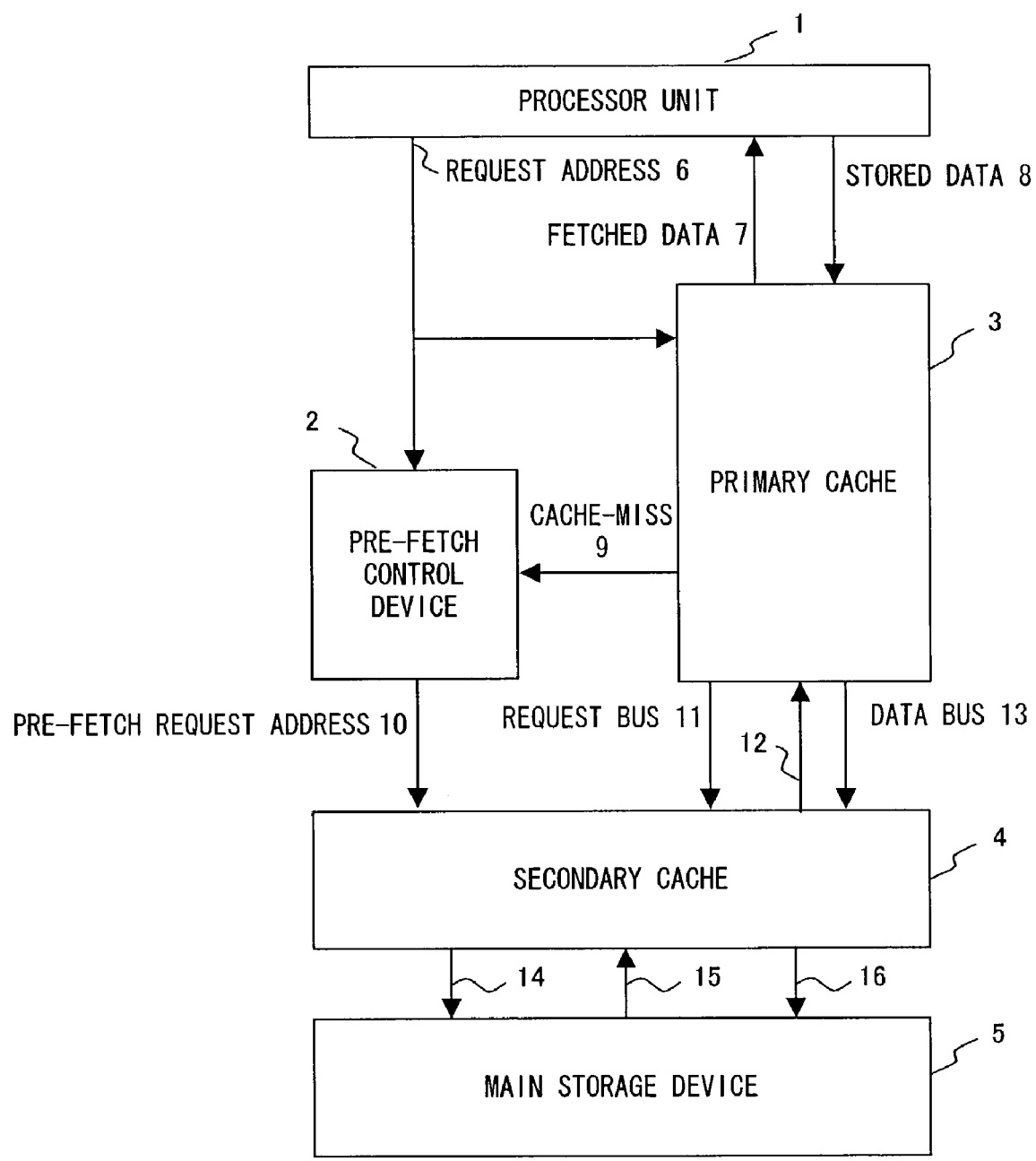
F I G. 1

FIG. 2A

| ADDRESS | DATA |
|---|---|
| A | D0 |
| A+1 | D1 |
| A+2 | D2 |
| . | . |
| . | . |
| A+(λ−1) | D(λ−1) |

FIG. 2B

| ADDRESS | DATA |
|---|---|
| A | D0 |
| A+1 | D1 |
| A+2 | D2 |
| . | . |
| . | . |
| A+(λ−1) | D(λ−1) |
| A+λ | Dλ |
| A+(λ+1) | D(λ+1) |
| A+(λ+2) | D(λ+2) |
| . | . |
| . | . |
| A+(2λ−1) | D(2λ−1) |

FIG. 2C

| ADDRESS | DATA |
|---|---|
| A | D0 |
| A+1 | D1 |
| A+2 | D2 |
| . | . |
| . | . |
| A+(λ−1) | D(λ−1) |
| A+λ | Dλ |
| A+(λ+1) | D(λ+1) |
| A+(λ+2) | D(λ+2) |
| . | . |
| . | . |
| A+(2λ−1) | D(2λ−1) |
| A+2λ | D2λ |
| A+(2λ+1) | D(2λ+1) |
| A+(2λ+2) | D(2λ+2) |
| . | . |
| . | . |
| A+(3λ−1) | D(3λ−1) |

|        | FIG. 6A | FIG. 6B      | FIG. 6C      | FIG. 6D       |
|--------|---------|--------------|--------------|---------------|
| entry0 | A       | $E+\lambda$  | $E+\lambda$  | $A+\lambda$   |
| entry1 | B       | A            | empty        | $E+\lambda$   |
| entry2 | C       | B            | B            | B             |
| entry3 | D       | C            | C            | C             |

|        | FIG. 6E      | FIG. 6F       |
|--------|--------------|---------------|
| entry0 | $A+\lambda$  | $B+\lambda$   |
| entry1 | $E+\lambda$  | $A+\lambda$   |
| entry2 | empty        | $E+\lambda$   |
| entry3 | C            | C             |

| | 1 | 2 | 3 | 4 | 5 | 6 | 7 | 8 | 9 | 10 |
|---|---|---|---|---|---|---|---|---|---|---|
| REQUEST ADDRESS REGISTER | | C | | | | | | | | |
| WAIT BIT OF ENTRY 0 | | | | | | | | | | |
| WAIT BIT OF ENTRY 1 | | | | | | | | | | |
| WAIT BIT OF ENTRY 2 | | | ⎍ | | | | | | | |
| WAIT BIT OF ENTRY 3 | | | | | | | | | | |
| ADDRESS OF ENTRY 0 | | | A | | C+$\lambda$ | | | | | |
| ADDRESS OF ENTRY 1 | | | B | | A | | | | | |
| ADDRESS OF ENTRY 2 | | | C | | B | | | | | |
| ADDRESS OF ENTRY 3 | | | D | | D | | | | | |
| PRE-FETCH ADDRESS REGISTER | | | | | C+$\lambda$ | | | | | |

F I G. 8

| | |
|---|---|
| + | A |
| − | B |
| − | C |
| + | D | entry0
entry1
entry2
entry3

DIRECTION FLAG

FIG. 11A

| | |
|---|---|
| + | E+λ |
| + | A |
| − | B |
| − | C |

FIG. 11B

| | |
|---|---|
| − | E−λ |
| + | E+λ |
| + | A |
| − | B |

FIG. 11C

| | |
|---|---|
| − | E−λ |
| + | E+λ |
| + | A |
| | empty |

FIG. 11D

| | |
|---|---|
| − | B−λ |
| − | E−λ |
| + | E+λ |
| + | A | entry0
entry1
entry2
entry3

FIG. 11E

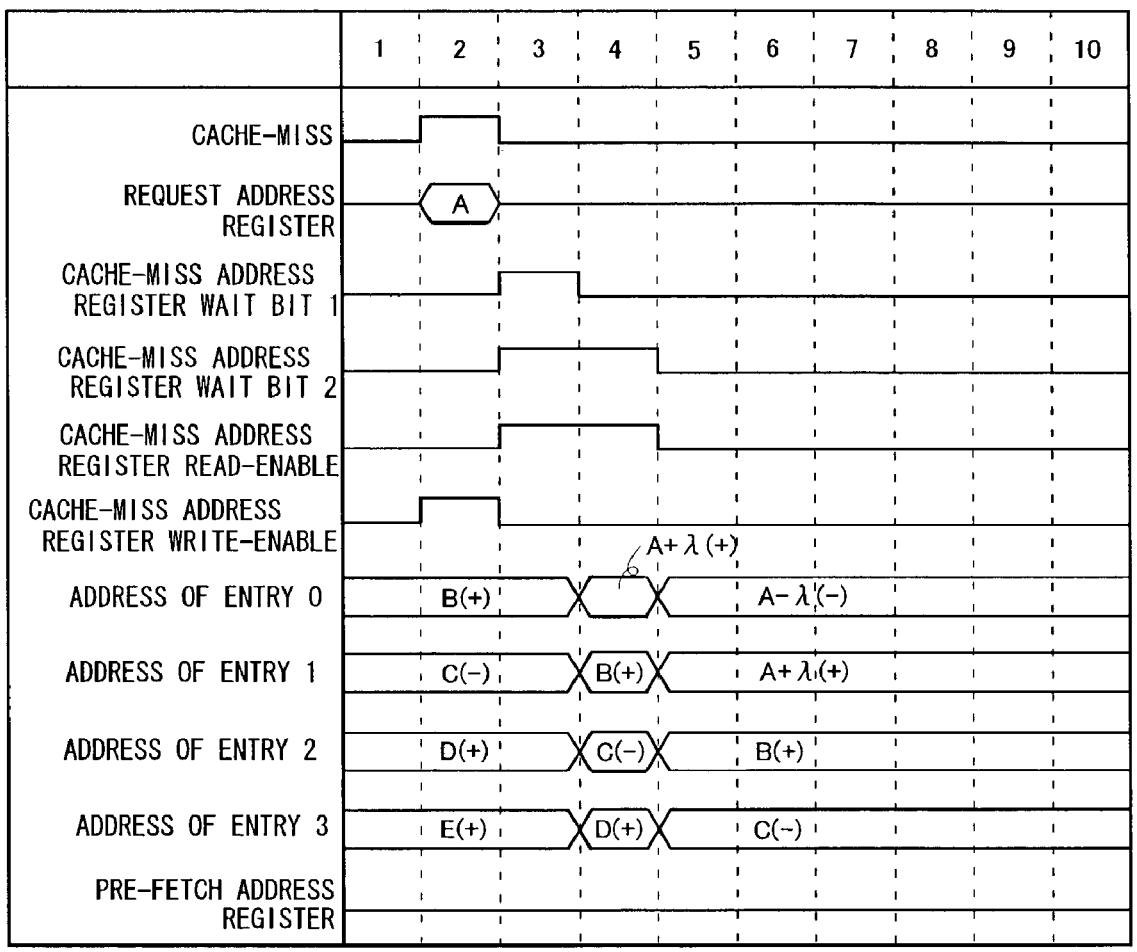
F I G. 1 2

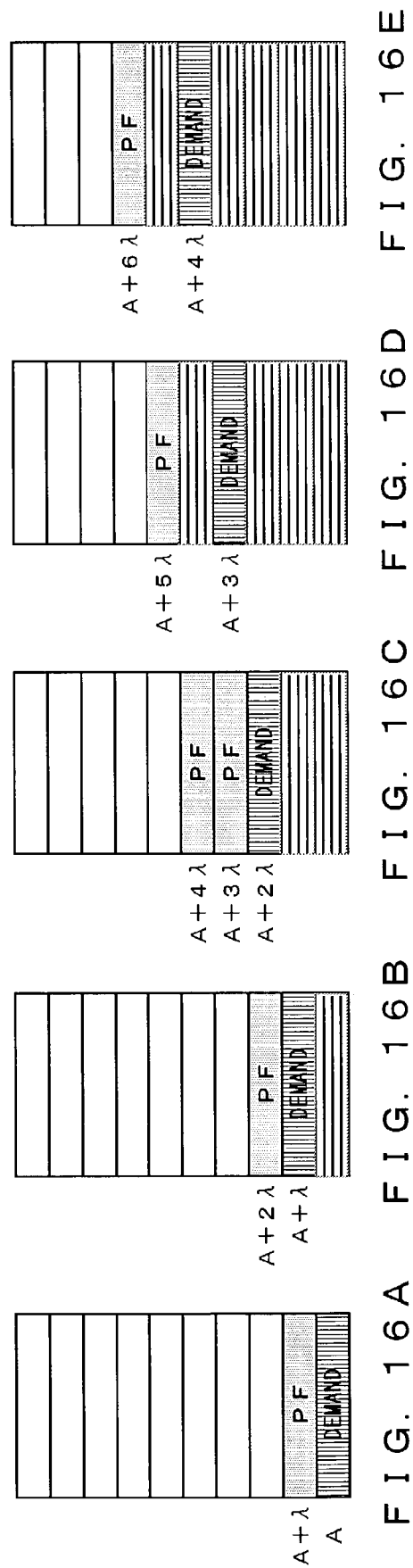

FIG. 17A

|  | COUNTER | NUMBER OF BLOCKS |
|---|---|---|
| entry0 | 6 | +4 | A |
| entry1 | 0 | +2 | B |
| entry2 | 8 | −4 | C |
| entry3 | 10 | −2 | D |

FIG. 17B

| 16 | +1 | E+λ |
| 6 | +4 | A |
| 0 | +2 | B |
| 8 | −4 | C |

FIG. 17C

| 16 | −1 | E−λ |
| 16 | +1 | E+λ |
| 6 | +4 | A |
| 0 | +2 | B |

FIG. 17D

| 16 | −1 | E−λ |
| 16 | +1 | E+λ |
|  |  | empty |
| 0 | +2 | B |

FIG. 17E

| 5 | +4 | A+λ |
| 16 | −1 | E−λ |
| 16 | +1 | E+λ |
| 0 | +2 | B |

FIG. 17F

| 5 | +4 | A+λ |
| 16 | −1 | E−λ |
| 16 | +1 | E+λ |
|  |  | empty |

FIG. 17G

| 16 | +4 | B+λ |
| 5 | +4 | A+λ |
| 16 | −1 | E−λ |
| 16 | +1 | E+λ |

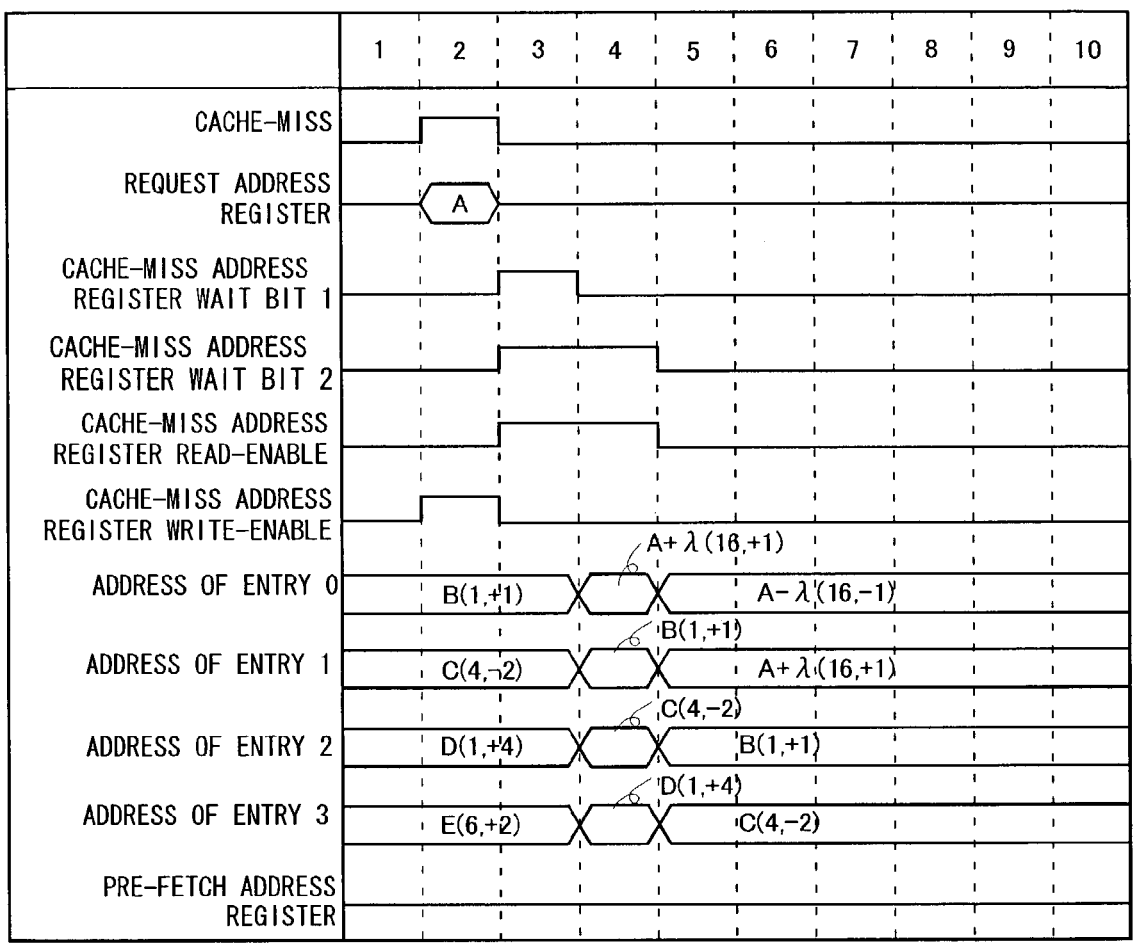
F I G. 1 8

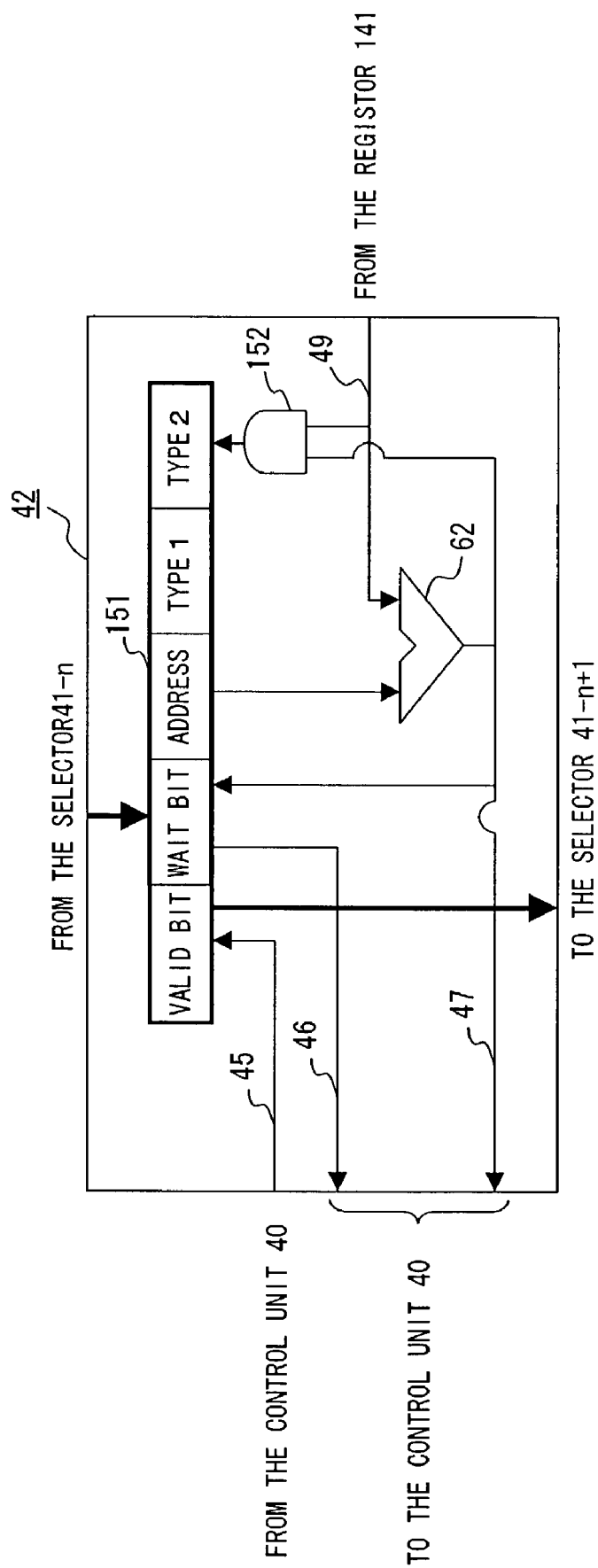
F I G. 21

PRE-FETCH CONTROL DEVICE, DATA PROCESSING APPARATUS AND PRE-FETCH CONTROL METHOD

BACKGROUND OF THE INVENTION

1. Field of the Invention

The present invention relates to pre-fetching instructions/data of a data processing apparatus.

2. Description of the Related Art

Conventionally, the processing speed of a computer has been improved by a method for improving the memory access speed by providing a cache memory between a CPU and a main storage device.

Furthermore, since the difference between memory access time and a CPU instruction execution cycle has increased, the further improvement of both a cache memory hit ratio and cache-miss latency is demanded.

For one method of solving such a problem, pre-fetch is used.

Pre-fetch is a method for predicting an instruction or data to be needed in the near future and storing the predicted instructions or data in a cache memory and the like in advance, and can reduce the hit-miss ratio of a cache. However, if unnecessary data is pre-fetched, necessary data may be removed from the cache. Therefore, there is also the probability of reducing its catch-hit ratio. In this case, how accurately the address of an instruction or data to be pre-fetched can be predicted.

Pre-fetch is largely classified into two methods: software application fetch by a pre-fetch instruction inserted by a compiler and the like, and pre-fetch prediction by hardware. For example, for pre-fetch by hardware, a method for pre-fetching a block next to a block for which a cache misses is well known.

As described earlier, in pre-fetching, address prediction is a major problem. In other words, although pre-fetch is necessary, useless pre-fetch must be suppressed.

In the method for pre-fetching a block next to a block for which a cache misses, a block is pre-fetched only when a cache misses. Therefore, if a plurality of blocks are consecutively accessed, it is clear that there is shortage in the number of blocks to be pre-fetched. There is a method for pre-fetching a series of blocks in advance in order to solve this problem. However, in this case, since the size of data to be pre-fetched increases, there is great loss if a prediction fails.

If even when a series of addresses are accessed, there are a series of accesses to different data areas where data is transferred between a plurality of data areas, it is difficult to predict an address simply using the order of request addresses.

SUMMARY OF THE INVENTION

The present invention aims at solving the above mentioned problems and providing a pre-fetch control device, a data processing apparatus and a pre-fetch control method.

In order to attain this aim, a data processing apparatus according to the present invention comprises a cache memory unit, an address registration unit and a pre-fetch request unit.

The address registration unit registers address values, based on addresses that have been previously accessed.

The pre-fetch request unit issues a pre-fetch request to the cache memory unit, based on a result of comparison between a request address using which access was requested and the address value registered in the address registration unit.

It is assumed that a pre-fetch control device according to the present invention is used in a data processing apparatus with a cache memory unit. The pre-fetch control device comprises the address registration unit and pre-fetch address registration unit and pre-fetch request unit.

This configuration can pre-fetch data based on a highly accurate prediction.

The pre-fetch request unit issues a pre-fetch request by providing a pre-fetch address calculated based on the address value described above to the cache memory unit. Then, by registering the address value based on this pre-fetch address in the address registration unit, a series of areas can be pre-fetched. If the processor stops accessing those areas, a further series of areas is prevented from being pre-fetched.

The address registration unit registers, for example, a direction flag indicating a pre-fetch direction in relation to the address value. The pre-fetch request unit issues a pre-fetch request by providing the pre-fetch address calculated based on the address value and the pre-fetch direction based on the direction flag to the cache memory unit. In this way, not only for successive accesses in ascending order but also for ones in descending order, data can be pre-fetched.

The address registration unit registers, for example, a plurality of address values. When registering a new address value, the address registration unit rewrites the address value based on the registration order of the plurality of address values. In this way, an unused and unnecessary address value is discarded and a new address value with a high probability of hitting remains in the address registration unit.

The address registration unit registers, for example, difference value information indicating the difference between a request address and a pre-fetch address in relation to the address value. Then, by calculating the request address using this difference value information, even data located at a plurality of heads of block of the request address can be pre-fetched.

The pre-fetch request unit prevents cache misses by providing the respective size of the pre-fetch address and data to be pre-fetched and issuing a pre-fetch request.

The address registration unit registers, for example, first type information indicating whether the request is a write request in relation to the address value. The pre-fetch request includes second type information indicating whether the request is a write request based on the first type information. In this way, whether data should be pre-fetched in a state where data can be written can be designated for the cache memory unit.

The pre-fetch request unit comprises, for example, a comparison unit comparing a plurality of such request addresses with the address value, and simultaneously generates a plurality of pre-fetch requests, based on the plurality of request addresses. In this way, two different pre-fetch addresses can be simultaneously predicted for two different cache accesses.

The data processing apparatus can also comprise a higher-order cache memory unit, which is ordered higher than the cache memory unit. In this way, since a pre-fetch request is issued to a lower-order cache memory unit, the cache-miss latency of the higher-order cache memory unit can be improved while suppressing the influence on the higher-order cache memory unit, of a pre-fetching process.

A pre-fetch control method adopted in a data processing apparatus with a cache memory unit is also included in the present invention.

BRIEF DESCRIPTION OF THE DRAWINGS

FIG. 1 shows the outline configuration of the CPU and its peripherals of a computer system in the preferred embodiment;

FIGS. 2A, 2B and 2C show the basic operation of a pre-fetching process in the first preferred embodiment;

FIGS. 6A, 6B, 6C, 6D, 6E and 6F show an example of the respective change of address values registered in a pre-fetch address queue in the first preferred embodiment;

FIG. 8 is the timing diagram of a case where an address registered in a pre-fetch address queue is requested in the first preferred embodiment;

FIGS. 11A, 11B, 11C, 11D and 11E show an example of the respective change of address values registered in a pre-fetch address queue in the second preferred embodiment;

FIG. 12 is the timing diagram of a case where an address is registered in a pre-fetch address queue when the address does not hit in the second preferred embodiment;

FIGS. 16A, 16B, 16C, 16D and 16E show the basic operation of a pre-fetching process in the third preferred embodiment;

FIGS. 17A, 17B, 17C, 17D, 17E, 17F and 17G show the respective change of address values registered in a pre-fetch address queue in the third preferred embodiment;

FIG. 18 is the timing diagram of a case where an address is registered in a pre-fetch address queue when the address does not hit in the third preferred embodiment;

FIG. 21 shows the configuration of the entry of a pre-fetch address queue in the fourth preferred embodiment;

DESCRIPTION OF THE PREFERRED EMBODIMENTS

Figure 3:
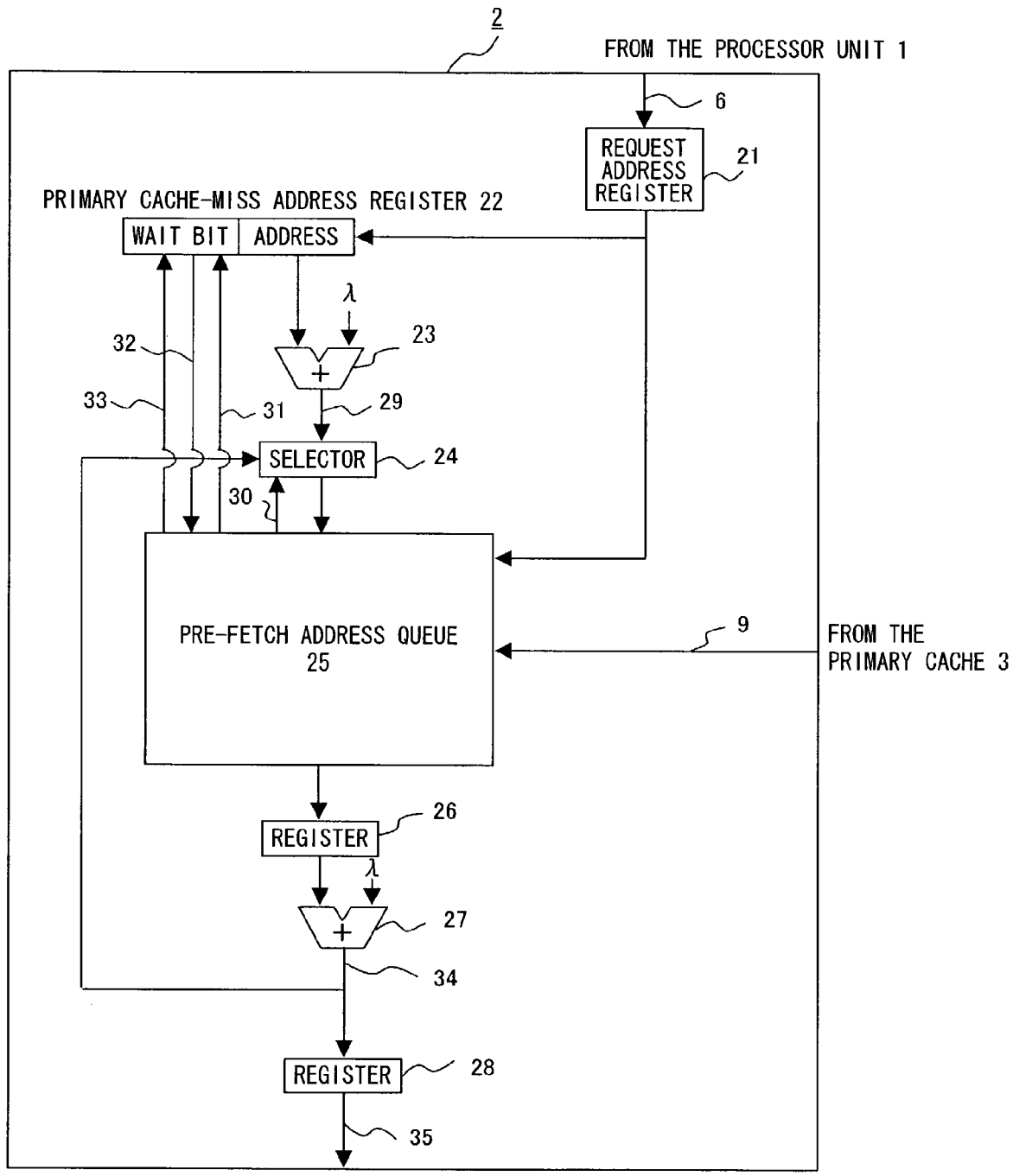
FIG. 3 shows the configuration of a pre-fetch control device in the first preferred embodiment.

FIG. 1 shows the outline configuration of the CPU and its peripherals of a computer system in the preferred embodiment.

The configuration shown in FIG. 1 comprises a processor unit 1, a pre-fetch control device 2, a primary cache 3, a secondary cache 4 and a main storage device 5.

The processor unit 1 includes an ALU, registers and the like. The processor unit 1 actually calculates/processes data. In the configuration shown in FIG. 1, branch prediction and the like is also conducted in the processor unit 1, and a request based on the result of a prediction is issued to the primary cache 3. The pre-fetch control device 2 controls the entire pre-fetching process. The pre-fetch control device 2 requests the secondary cache 4 to pre-fetch data while monitoring a request address to the primary cache 3 from the processor unit 1. The primary cache 3 is a primary cache system, and further comprises a memory with high access speed and a primary cache control device. The secondary cache 4 is a secondary cache system, further comprising a memory with access speed higher than the main storage device 5 and capacity larger than a secondary cache control device. In this preferred embodiment, the pre-fetched data is stored in the secondary cache 4. The main storage device 5 is a memory composed of a DRAM and the like.

When accessing data in the main storage device 5, the processor unit 1 selects a request address 6 from a processor unit 1. When reading data, the processor unit 1 reads fetched data 7 and when writing data, the unit 1 outputs the read data to the primary cache 3 as stored data 8.

If the primary cache 3 has data for the request address, the primary cache 3 outputs the data to the processor unit 1 as fetched data 7 in response to a read request from the processor unit 1. If the primary cache 3 does not has the data, the primary cache 3 requests the secondary cache 4 to provide data for one line, including data from a request bus 11 and simultaneously notifies the pre-fetch control device 2 of the fact as cache-miss 9. Then, on receipt of fetched data 12, the primary cache 3 outputs requested data to the processor unit 1 as fetched data 7. If its own cache data is updated, the primary cache 3 writes back the data into the secondary cache 4 through a data bus 13 at a suitable time.

In response to a request for data from the primary cache 3, if the secondary cache 4 has the data, the secondary cache 4 outputs data for one line, including the data, to the primary cache 3 as fetched data 7. If the cache 4 does not have the data, the secondary cache 4 requests the main storage device 5 to provide the data for one line, including the data, through a request bus 14. Then, on receipt of fetched data 15, the secondary cache 4 outputs the data for one line to the primary cache 3. If its own cache data is updated, the secondary cache 4 also writes back the data into the main storage device 5 through a data bus 16 at a suitable time, like the primary cache 3.

When requesting the primary cache 3 to provide data, the processor unit 1 designates an address through an address bus 6. The pre-fetch control device 2 monitors this address value and retrieves data from its own pre-fetch address queue 25 using this address value. Then, if one block with an address in the pre-fetch address queue as a head includes this address (hereinafter referred to as 'hit'), the pre-fetch control device 2 outputs the pre-fetch request address to the secondary cache 4 through a pre-fetch address bus 10 and issues a pre-fetch request. Simultaneously, the pre-fetch control device 2 registers the address in the pre-fetch address queue 25. If the pre-fetch address queue does not contain the address, the pre-fetch control device 2 does not issue a pre-fetch request. If the primary cache 3 reports cache-miss using a control signal 9 even when the pre-fetch address queue 25 does not include the corresponding address, the pre-fetch control device 2 starts registering this address in the pre-fetch address queue 25.

FIG. 2 shows the basic operation of a pre-fetching process in the first preferred embodiment.

In the first preferred embodiment, the pre-fetch control device 2 pre-fetches data from the secondary cache 4 in units of blocks of a specific size. Although the block size is arbitrary, in the following example, the size is assumed to be one line of the secondary cache 4 (the size of the unit area of the secondary cache 4 handled in caching).

FIG. 2A shows its initial state. It is assumed that for one block of data with address A as a head (it is assumed that the size of one block is $\lambda$), that is, the secondary cache 4 pre-fetches the data D0 through D($\lambda$−1) of addresses A through A+($\lambda$−1). In this state, address A is registered in the pre-fetch address queue 25 as a pre-fetch address.

In the state shown in FIG. 2A, if a request address from the processor unit 1 is address A, the primary cache 3 reads the data D0 of address A pre-fetched from the secondary cache 4 and simultaneously outputs the data D0 to the processor unit 1. In this case, the pre-fetch control device 2 monitors the request address sent from the processor unit 1 to the primary cache 3 and checks whether the request address can hit by comparing the request address with an address registered in the pre-fetch address queue 25.

In the example shown in FIG. 2A, since address A hits, the pre-fetch control device 2 requests the secondary cache 4 to pre-fetch one block of data from address A+$\lambda$, and simultaneously updates a pre-fetch address registered in the pre-fetch address queue 25 to A+$\lambda$. In this way, as shown in FIG. 2B, the data D$\lambda$ through D(2$\lambda$−1) of addresses A+$\lambda$ through A+(2$\lambda$−1) are newly pre-fetched in the secondary cache 4.

In the state shown in FIG. 2B, if the process of the processor unit 1 advances and the processor unit 1 requests the primary cache 3 to provide the data at address A+$\lambda$, this address hits. Therefore, the pre-fetch control device 2 requests the secondary cache 4 to pre-fetch one block of data from address A+2$\lambda$, as shown in FIG. 2C.

After that, every time a request address from the processor unit 1 hits, the pre-fetch control device 2 requests the secondary cache 4 to pre-fetch the next sequential block of data after the block containing the address as a head that just hit.

In this way, in the first preferred embodiment, an address obtained by adding block size $\lambda$ to the address that previously hit in the pre-fetch address queue 25 is stored in advance. By comparing this pre-fetch address with a request address requested by the processor unit 1, a series of accesses can be accurately predicted and pre-fetched.

FIG. 3 shows the configuration of the pre-fetch control device 2 in the first preferred embodiment.

In the configuration shown in FIG. 3, the pre-fetch control device 2 includes a request address register 21, a primary cache-miss address register 22, two adders 23 and 27, a selector 24, a pre-fetch address queue 25, a read register 26 and a pre-fetch address register 28.

The request address register 21 is a register storing the address values on an address bus 6, and the address value derived from the address value in this request address register 21 is stored in the pre-fetch address queue 25. The primary cache-miss address register 22 registers the address of the request address register 21 according to instruction by the control signal 31 from the pre-fetch address queue 25. In this case, when an address value is registered, a wait bit is set and a control signal 32 is output to the pre-fetch address queue 25, based on this wait bit. The pre-fetch address queue 25 is used to store/manage addresses based on addresses to which memory access has been made and a plurality of leading addresses of blocks next to addresses that previously hit in the pre-fetch address queue 25 are stored. The pre-fetch control device 2 compares the address values of the request address register 21 with the address values stored in this pre-fetch address queue 25 and judges whether the pre-fetch control device 2 should request the secondary cache 4 to pre-fetch data. The pre-fetch address register 28 stores pre-fetch addresses output when the pre-fetch control device 2 requests the secondary cache 4 to pre-fetch data.

Next, the operation of the pre-fetch control device 2 shown in FIG. 3 is described.

In the configuration shown in FIG. 3, first, an address value designated by the address bus 6 when the processor unit 1 requests the primary cache 3 to provide data is temporarily stored in the request address register 21. Then, the address of the request address register 21 and an address value (entry address) stored in each entry of the pre-fetch address queue 25 are compared.

If as a result of this comparison, the address value hits, its entry address is read in the register 26 and the adder 27 adds block size $\lambda$ to the value of the register 26. Then, this added value is written in the pre-fetch address register 28 through an address bus 34. Then, the pre-fetch control device 2 requests the secondary cache 4 to pre-fetch data through an address bus 35 using the address value of this pre-fetch address register 28. In this case, the selector 24 is controlled so that data through an address bus 34 can be selected/output from the pre-fetch address queue 25 by a control signal 30 and the value obtained by adding block size $\lambda$ to the value of the register 26 is registered in the pre-fetch address queue 25 as a new entry address.

However, if the address value of the request address register 21 and the pre-fetch address of the pre-fetch address queue 25 are compared and the request address does not hit, its entry is not read and pre-fetch is not requested. Therefore, the entry address of the pre-fetch address queue 25 is also not updated.

However, even if this request address does not hit, when the request address causes a cache-miss in the primary cache 3 and the primary cache 3 reports this cache-miss using a control signal 9, the pre-fetch address queue 25 instructs the primary cache-miss address register 22 to register the address value of the request address register 21 using a control signal 31. And if the address value is registered in the primary cache-miss address register 22, a wait bit is set and this is reported to the pre-fetch address queue 25 by a control signal 32 as a new pre-fetch address register request. On receipt of this notice, if no address is registered through the address bus 34 (after the completion of the registration if an address is registered), the pre-fetch address queue 25 clears the wait bit of the primary cache-miss register 22 using a control signal 33 and permits its registration. Then, the pre-fetch address queue 25 controls the selector 24 so as to select/output input through an address bus 29 using the control signal 30 and registers the address value obtained by adding block size $\lambda$ to the value of the register 22 using an adder 23.

Figure 4:
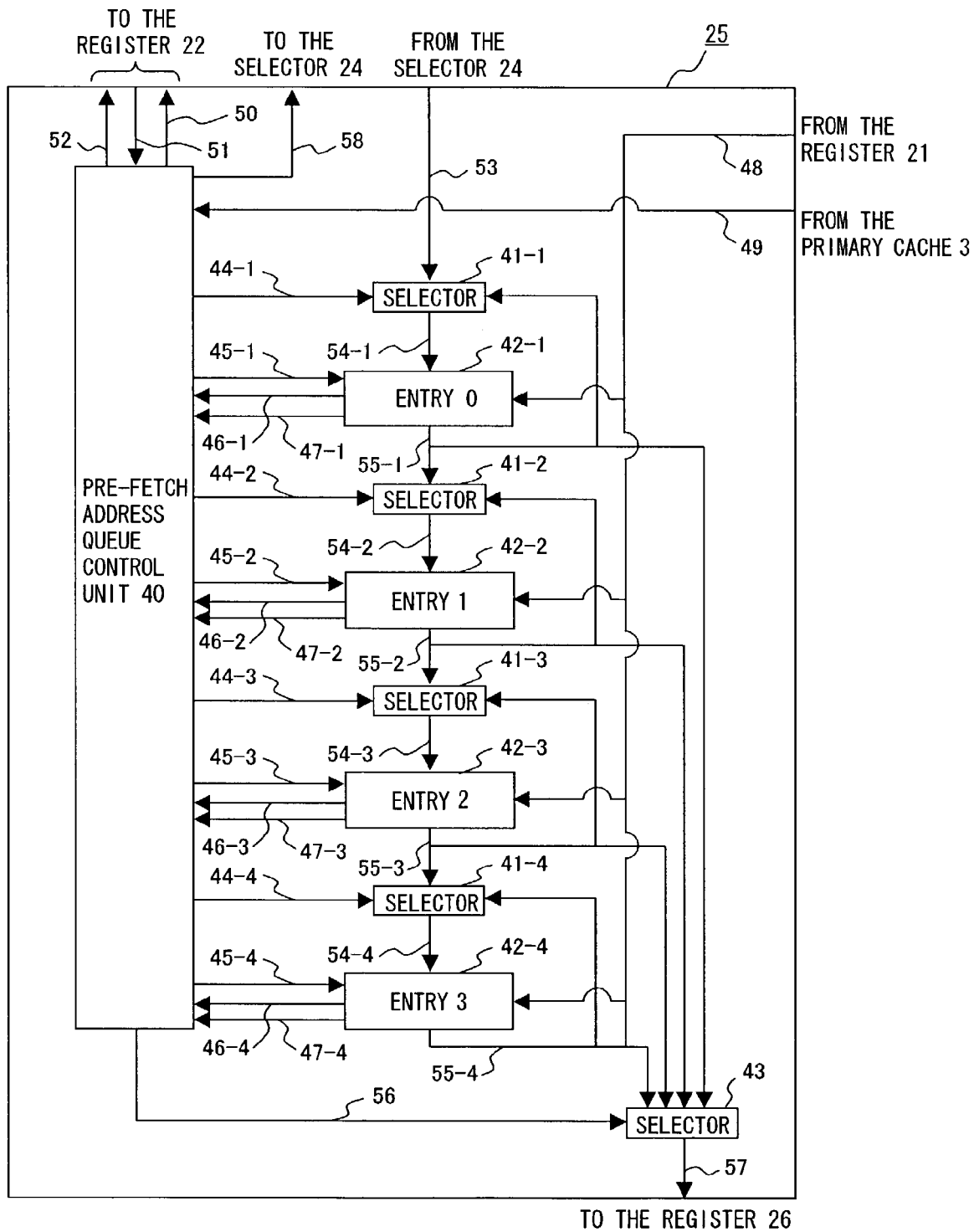
FIG. 4 shows the configuration of a pre-fetch address queue in the first preferred embodiment.

FIG. 4 shows the configuration of the pre-fetch address queue 25 shown in FIG. 3.

The pre-fetch address queue 25 shown in FIG. 4 includes a pre-fetch address queue control unit 40 controlling the pre-fetch address queue 25, specifically controlling both the registration of an address value in the primary cache-miss register 22 and the clear of a wait bit by control signals 50 and 52 (which correspond to the control signals 31 and 33 shown in FIG. 3) and controlling the selector 24 using a control signal 58 (which corresponds to the control signal 30); a plurality of entries 42 storing pre-fetch addresses and a plurality of selectors 41 corresponding to the entries 42 (four entries 42-1 through 42-4 and four selectors 41-1 through 41-4 in FIG. 4); and a selector 43.

The pre-fetch address queue 25 shown in FIG. 4 operates as a FIFO type queue storing four pre-fetch addresses. If the request address does not hit and a new address value is registered, the address values stored in entries 42-1, 42-2 and 42-3 are shifted to entries 42-2, 42-3 and 42-4, respectively, and simultaneously a new address value is registered in the entry 42-1. If the request address hits, the pre-fetch address queue 25 deletes the hit address value from the entry, and simultaneously updates the entry address by registering a new address value obtained by adding block size λ to the hit address value, in the entry 42-1.

Figure 5:
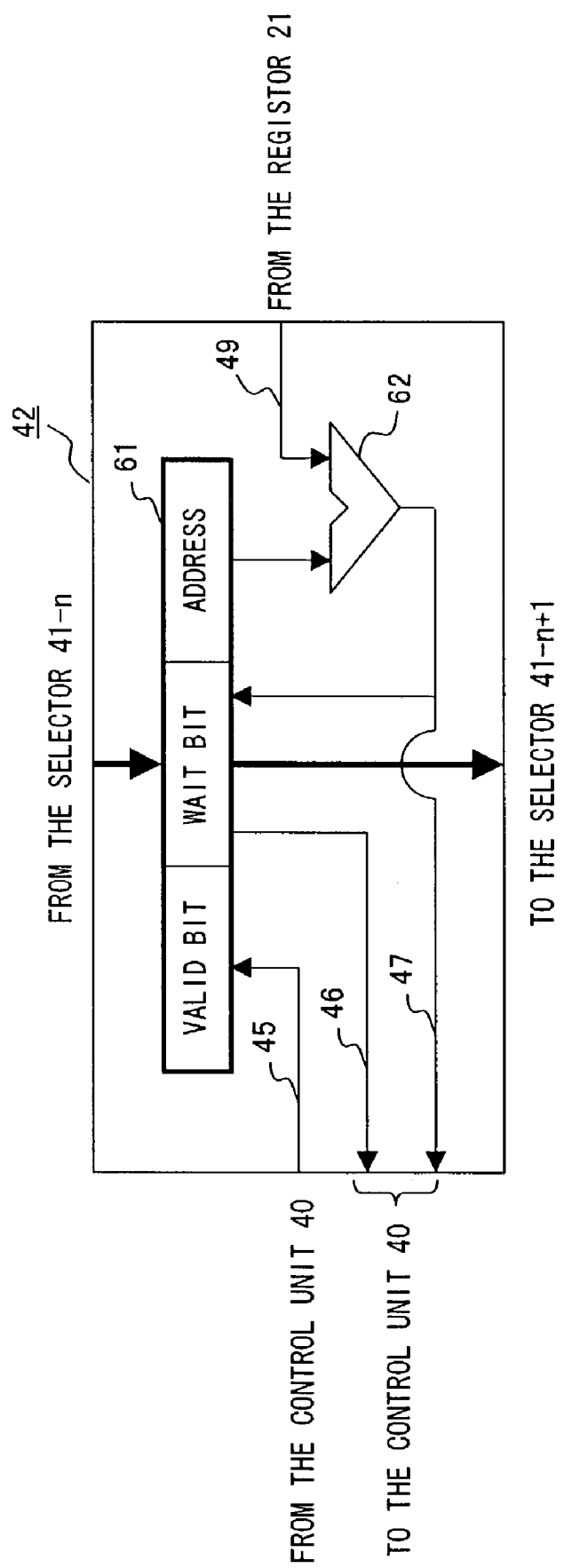
FIG. 5 shows the configuration of the entry of a pre-fetch address queue in the first preferred embodiment.

FIG. 5 shows the configuration of the entry 42 shown in FIG. 4.

The entry 42 shown in FIG. 5 includes a register 61 storing an address value to be registered in the entry 42 and a comparator 62. In addition to an address value, the register 61 stores a valid bit and a wait bit each of which works as a status flag. The comparator 62 compares the address value of the request address register 21 that is input through an address bus 49 with the address value set in the register 61, and outputs the result to the pre-fetch address queue control unit 40 as a control signal 47.

The valid bit of the register 61 indicates whether the address value set in the register 61 is valid. When an address value from the selector 41 is registered in the register 61, a valid bit is set. When an address value is read from this entry 42, the valid bit is cleared by a control signal 45 from the pre-fetch address queue control unit 40. When an address value input through the address bus 49 hits, and a valid bit of the entry stored in the hit address value is set, the wait bit is set. The pre-fetch address queue control unit 40 determines an entry to read, based on the state of this wait bit sent as a control signal.

The operation of the pre-fetch address queue 25 is described below with reference to FIGS. 4 and 5.

A request address from the processor unit 1 is stored in the request address register 21 and is input to each of the entries 42-1 through 42-4 through an address bus 48. If for each of the entries 42-1 through 42-4 in which the valid bit is set, a comparator 62 compares this request address value with the address value set in the register 61. If the two addresses are the same, the hit is reported to the pre-fetch address queue control unit 40 by a control signal 47 and the wait bit of the register 61 is set.

Then, the pre-fetch address queue control unit 40 determines an entry to read based on the wait bit of each entry, and outputs the address value registered in this entry 42 to the register 26 through an address bus 57 as a pre-fetch request, and simultaneously clears the valid bit of the entry 42 using a control signal 45.

If the primary cache 3 reports a cache-miss using a control signal 49, the pre-fetch address queue control unit 40 checks the result of address comparison in each of the entries 42-1 through 42-4 reported by control signals 46-1 through 46-4, respectively. Then, if the request address is not the same as any of the entries 42-1 through 42-4, the pre-fetch control unit 40 instructs the primary cache-miss address register 22 to register the address in the request address register 21 using a control signal 50.

When the primary cache-miss address register 22 requests the pre-fetch address queue control unit 40 to register the address value in the primary cache-miss address register 22 as an entry address using a control signal 51 or immediately after the reading of the address value from the entry 42 has been completed, the pre-fetch address queue control unit 40 controls a selector 41-1 so as to select an input through an address bus 53 and to output the input to an address bus 54-1, using a control signal 44-1, and registers the address input from the address 53 in the entry 42-1.

If the valid bit is set in the entry 42-1 when a new address value is set from the address 53, the pre-fetch address queue control unit 40 controls a selector 41-2 so as to output an address value input from an address bus 55-1 to an address bus 54-2 using a control signal 44-2 and sets the address value set in the entry 42-1 in the entry 42-2. Similarly, if a valid bit is set in the entries 42-2 and 42-3, the control unit 40 controls selectors 41-3 and 41-4 using control signals 44-3 and 44-4 to shift the address values set entries 42-3 and 42-4 to respective lower-order entries. In this case, the pre-fetch address queue control unit 40 controls the selector 41 to write back the address value set in the entry 42 whose value is not updated, using a control signal 45.

FIG. 6 shows an example of the respective change of address values registered in the pre-fetch address queue 25. In FIGS. 6, 11, 16 and after, the latest address value registered in the entry 42-1 is described as entries 0 and address values registered in entries 42-2, 42-3 and 42-4 are described as entries 1, 2 and 3 respectively. An entry in which a valid bit is reset is described as empty.

FIG. 6A shows its initial state. In FIG. 6A, pre-fetch addresses A, B, C and D are already registered in entries 0, 1, 2 and 3, respectively.

In the state shown in FIG. 6A, if it is reported that there is a cache-miss for an address E in the primary cache 3, as shown in FIG. 6B, an address value E+λ obtained by adding block size λ to the address value E is registered as entry 0 in the pre-fetch address queue 25. In this case, the address values A through C, which were registered in the entries 0 through 3, respectively, are shifted to entries 1 through 3, respectively, and the address D which was registered in the entry 3 is discarded.

FIGS. 6C and 6D show the change from the state shown in FIG. 6B caused when there is a cache access to the address A from the processor unit 1.

In the state shown in FIG. 6B, if there is a cache access to the address A from the processor unit 1, the entry 1 that hits is read, and simultaneously the entry 1 is invalid by resetting the valid bit, as shown in FIG. 6C. The pre-fetch control unit 2 requests the secondary cache 4 to pre-fetch an address A+λ (λ is a block size), and simultaneously, as shown in FIG. 6D, registers this address value (A+λ) in the pre-fetch address queue 25. In this case, the address value E+λ which was entry 0 in FIG. 6C is shifted to entry 1 which is invalid (empty).

In the state shown in FIG. 6D, if there is a cache access to the address B from the processor unit 1, the hit entry 2 is read, and simultaneously the entry 2 is changed invalid by resetting the valid bit, as shown in FIG. 6E. The pre-fetch control unit 2 requests the secondary cache 4 to pre-fetch an address B+λ, and simultaneously, registers this address value in the pre-fetch address queue 25, as shown in FIG. 6F. In this case, the address A+λ which was in entry 0 in FIG.

6E and the address value E+λ which was in entry 1 are respectively shifted to entry 1 and entry 2 which is empty.

Figure 7:
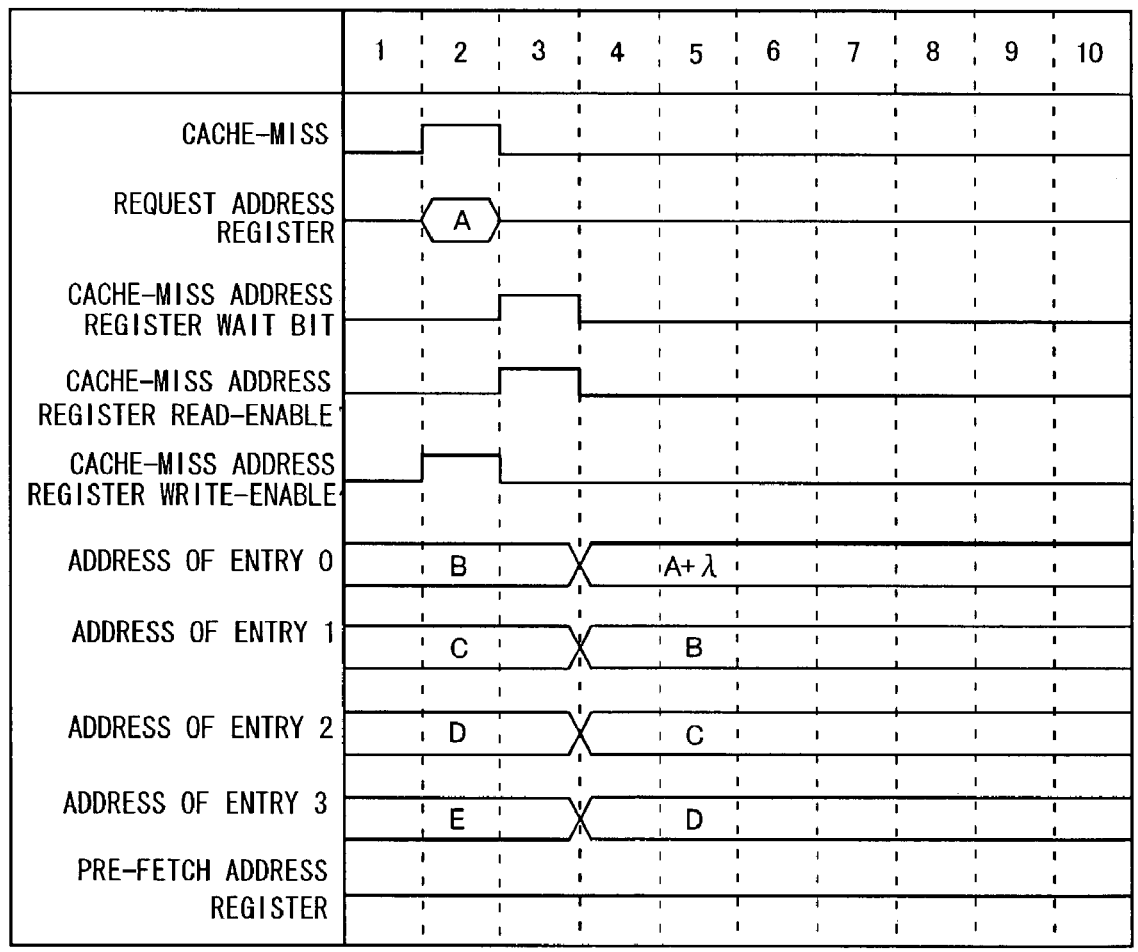
FIG. 7 is the timing diagram of a case where an address is registered in a pre-fetch address queue when the address does not hit in the first preferred embodiment.

FIG. 7 is the timing diagram of the case where there is cache-miss in the primary cache 3 and an address is registered in the pre-fetch address queue 25.

FIG. 7 shows the respective change of the following: cache-miss control (signals 9 and 49); the request address register 21; the wait bit of the primary cache-miss address register 22; a primary cache-miss address register read-enable (control signal 32); a primary cache-miss address register write-enable (control signal 31); an address value set in each entry 42; and an address value set in a pre-fetch address register 28 that is caused when the processor unit 1 requests the primary cache 3 to access to an address A in an initial state where address values B, C, D and E are registered as entries 0 through 3, respectively.

In FIG. 7, in cycle 2, a request address A from the processor unit 1 is set in the request address register 21. If the primary cache 3 notifies the pre-fetch control unit 2 of a cache-miss using a control signal 9 and the write enable signal of the primary cache-miss register 22 is set, then in next cycle 3, the pre-fetch control unit 2 sets the value of the request address register 21 in the primary cache-miss address register 22, and simultaneously sets await bit. In this way, the pre-fetch address queue control unit 40 sends a read-enable signal to the primary cache-miss address register 22. Then, in cycle 4, the control unit 40 sets the address value A+λ obtained by adding block size λ to the address value A of the primary cache-miss address register 22 in the entry 42-1 as entry 0, and simultaneously resets a wait bit. The address values B, C and D set in the entries 42-1, 42-2 and 42-3, respectively, are shifted and set in entries 1, 2 and 3, respectively.

In the example shown in FIG. 7, since the request address A does not hit, the pre-fetch request by the pre-fetch control device 2 is occurred. Therefore, there is no change in the value set in the pre-fetch address register 28.

FIG. 8 is the timing diagram of the case where an address registered in the pre-fetch address queue 25 is requested.

FIG. 8 shows the changes in the request address register 21, the state of the wait bit in each entry 42, the address value set in each entry and then address value set in the pre-fetch address register 28 that gets set when there is an access request from the processor unit 1 to the primary cache 3 using the address C registered in the entry 2 in the initial state shown in FIG. 6A.

In FIG. 8, in cycle 2, request address C from the processor unit 1 is set in the request address register 21. Since this address C is registered in the entry 42-3, in cycle 3, the wait bit of the entry 2 is set. In cycle 4, the valid bit is reset and the entry 2 is invalid.

Then, in cycle 5, an address value C+λ obtained by adding block size λ to the request address C in the primary cache-miss address register 22 is set in the entry 42-1 and the address values A and B set in the entries 42-1 and 42-2, respectively, are shifted and set in the entries 42-2 and 42-3. In cycle 5, the address value C+λ is set in the pre-fetch address register 28, and this address value is notified to the secondary cache 4 as a pre-fetch request.

Next, the second preferred embodiment is described.

In the first preferred embodiment described so far, when one block of data is pre-fetched from the secondary cache 4 for a request address from the processor unit 1, data is pre-fetched in an ascending direction (ascending order of address values) with a request address+λ as a head. However, in the second preferred embodiment, pre-fetch in a descending direction (descending order of address values) can be realized. Pre-fetch in a descending direction can be applied to the process of stack data and a case where arrayed data is processed in descending order.

Figure 9:
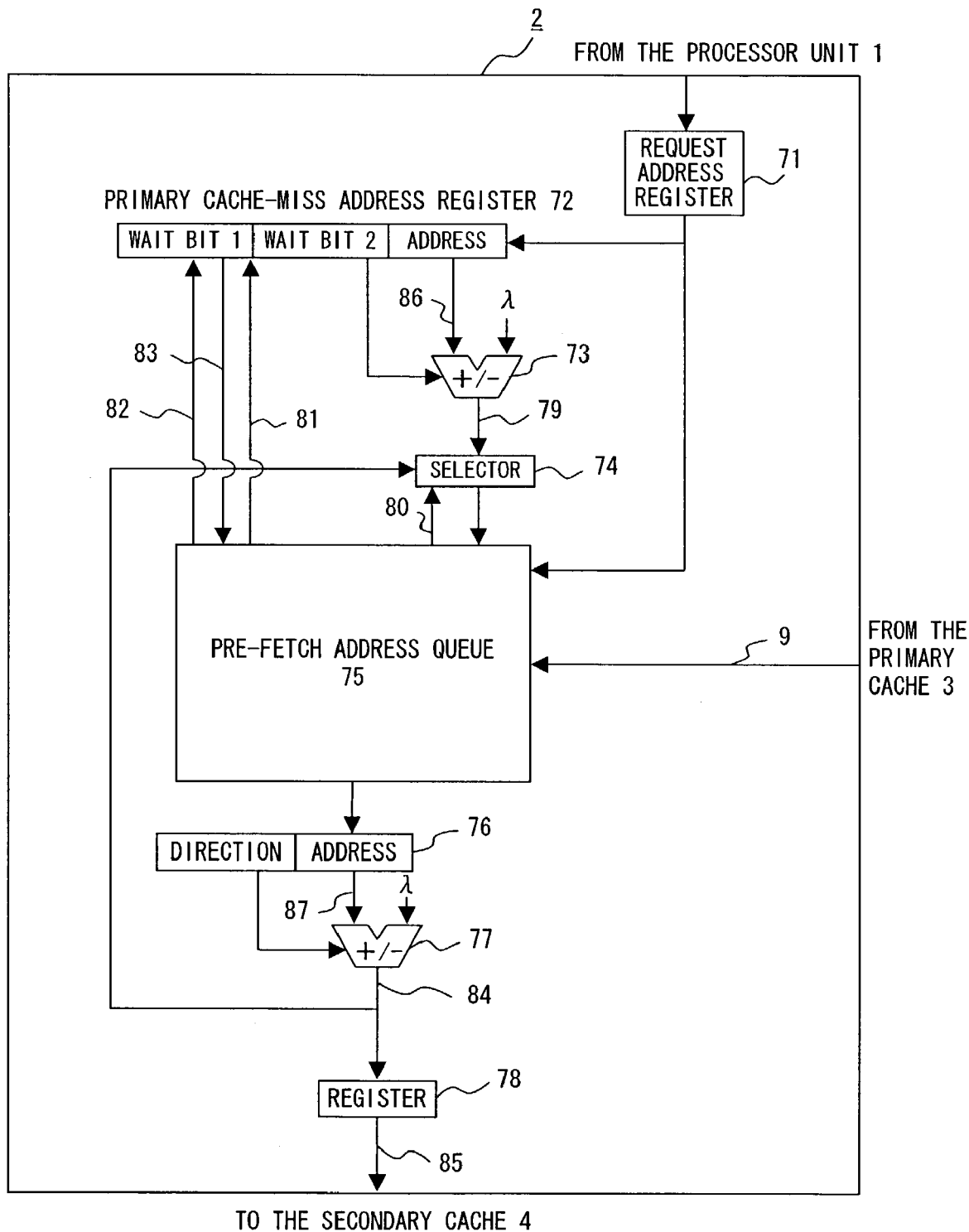
FIG. 9 shows the configuration of a pre-fetch control device in the second preferred embodiment.
Figure 10:
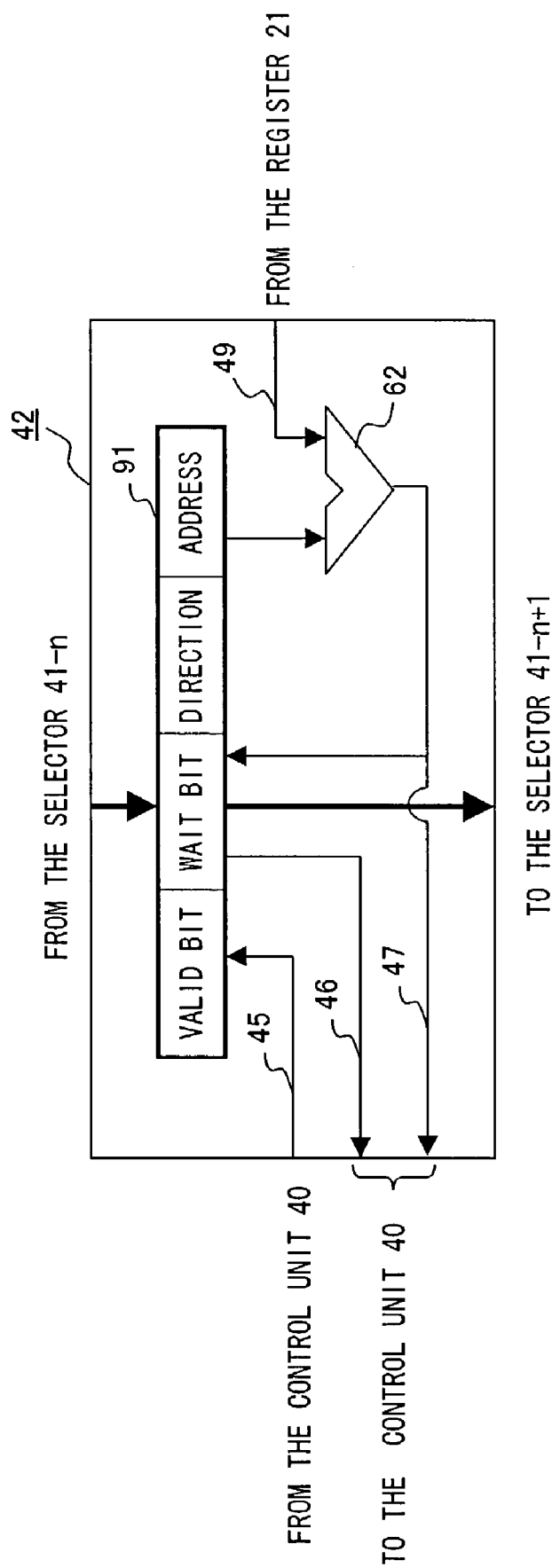
FIG. 10 shows the configuration of the entry of a pre-fetch address queue in the second preferred embodiment.

FIG. 9 shows the configuration of the pre-fetch control device 2 in the second preferred embodiment. FIG. 10 shows the configuration of the entry 42 in a pre-fetch address queue 75. The configuration of the pre-fetch address queue 75 is basically the same as that of the pre-fetch address queue 25 shown in FIG. 4 except for the configuration of each of the entries 42-1 through 42-4.

Compared with the pre-fetch control device 2 in the first preferred embodiment shown in FIG. 3, in the configuration of the pre-fetch control device 2 shown in FIG. 9, wait bits 1 and 2 can be set in a primary cache-miss address register 72 in addition to the address value of a request address register 71, and pre-fetch direction can be set in a read register 76. In a calculator 77, addition/subtraction can be switched over by the setting value of the wait bit 2 of the primary cache-miss address register 72. In a calculator 77, addition/subtraction can be switched over by setting the direction of the read register 76.

Compared with the configuration of the entry 42 in the first preferred embodiment shown in FIG. 5, in the configuration of the entry 42 in the second preferred embodiment shown in FIG. 10, a direction flag can be set in a register 91 in addition to an address value, a valid bit and a wait bit. In FIG. 10, the same reference numbers are attached to the same components as those used in FIG. 5.

In this second preferred embodiment, a direction flag indicating a pre-fetch direction is set in the entry 42 together with an address value. Then, a pre-fetch address is calculated by conducting the addition/subtraction of block size λ based on this direction flag for a hit address that is read from the pre-fetch address queue 75.

When this direction flag is set in an ascending direction (+), an address value registered with this direction flag in the pre-fetch address queue 75 is generated by adding block size λ. When the direction flag is set in a descending direction (−), the address value registered with this direction flag in the pre-fetch address queue 75 is generated by subtracting block size λ.

If the request address does not hit an address in the pre-fetch address queue 75 and a new address is registered in the pre-fetch address queue 75 by a cachet-miss notice from the primary cache 3, both an address value obtained by adding block size λ to the request address and an address value obtained by subtracting block size λ from the request address are registered. The wait bits 1 and 2 that are set in the primary cache-miss address register 72 are used for this control.

The basic operations of the configurations shown in FIGS. 9 and 10, such as the registration, retrieval, reading and the like of the pre-fetch address queue 75 are the same as those of the first preferred embodiment described with reference to FIGS. 3 and 5. In the configuration shown in FIG. 9, control over pre-fetching direction using the wait bits 1 and 2 is further provided. Only parts different from the first preferred embodiment are described below, and the parts common to both embodiments are omitted.

When the primary cache 3 notifies cache-miss using a control signal 9, the pre-fetch address queue 75 registers the request address registered in a request address register 71 in the primary cache-miss address register 72 using a control signal 81. In this time, the wait bits 1 and 2 of the primary cache-miss address register 72 are set.

When either of the wait bits 1 and 2 is set, the primary cache-miss address register 72 requests the pre-fetch address queue 75 to register the address value in the pre-fetch address queue 75 using a control signal 82.

The calculator 73 determines whether to add or subtract block size λ to/from the address value in the primary cache-miss register 72 that is input through an address bus 86, based on the respective states of the wait bits 1 and 2. If registration in the pre-fetch address queue 75 is permitted by a control signal 83 while the wait bit 1 is set, the calculator 73 outputs the value obtained by adding block size λ to the address value in the primary cache-miss address register 72, and sets the value to the pre-fetch address queue 75, and simultaneously clears the wait bit 1. And in this time, an ascending direction (+) is registered as a direction flag in the pre-fetch address queue 75 together with the value obtained by adding block size λ to the address value.

If registration in the pre-fetch address queue 75 is permitted by a control signal 83 while the wait bit 1 is reset and the wait bit 2 is set, the calculator 73 inputs/registers the value obtained by subtracting block size λ from the address value in the primary cache-miss address register 72, and simultaneously resets the wait bit 2. In this case, a descending direction (−) is registered as the direction flag in the pre-fetch address queue 75 together with the value obtained by adding block size λ to the address value. When the request address hits and the value of the pre-fetch address queue 75 is updated through an address bus 84, the direction flag set in the read register 76 is registered together with the address value.

When the request address hits and the address value is read from the pre-fetch address queue 75, the direction flag is also read and set in the read register 76. A calculator 77 adds/subtracts block size λ to/from an address value input through an address bus 87, based on the direction flag set in the read register 76. If the direction flag of the read register 76 shows an ascending direction (+), the calculator 77 outputs a value obtained by adding block size λ to an address value input through an address bus 77 to an address bus 84. If the direction flag of the read register 76 shows a descending direction (−), the calculator 77 outputs a value obtained by subtracting block size λ from an address value input through an address bus 77 to an address bus 84. Then, this address value is output to the secondary cache 4 through a pre-fetch address register 78 and an address bus 85, as a pre-fetch request.

FIG. 11 shows an example of the respective change of address values registered in the pre-fetch address queue 75 in the second preferred embodiment.

In FIG. 11, symbol "+" indicates that a direction flag is set in an ascending direction where addition is conducted for address calculation. Symbol "−" indicates that a direction flag is set in a descending direction where subtraction is conducted for address calculation. An address value X in which a direction flag is set in an ascending direction and an address value X in which a direction flag is set in a descending direction are denoted as X(+) and X(−), respectively, below.

FIG. 11A shows the devices' initial state. In the initial state, pre-fetch addresses A(+), B(−), C(−) and D(+) are already registered as entries 0, 1, 2 and 3 of the pre-fetch address queue 75.

In the state shown in FIG. 11A, if it is notified of the cache-miss of address E in the primary cache 3, as shown in FIG. 11B, an address value obtained by adding block size λ to the address E and an ascending direction flag E+λ(+) are registered in the pre-fetch address queue 75 as entry 0. In this case, the address values and direction flags A(+), B(−) and C(−) that are registered as entries 0 through 2 are shifted to entries 1 through 3, respectively, and the address value and direction flag D(+) that are registered as entry 3 are discarded.

Since request address E does not hit an address value in the pre-fetch address queue 75, as shown in FIG. 11B, an address value obtained by subtracting block size λ from the address value E and a descending direction flag E−λ(−) are registered in succession in the pre-fetch address queue 75 as entry 0. In this case, the address values and direction flags E+λ(+), A(+) and B(−) that are registered as entries 0 through 2, respectively, are shifted to entries 1 through 3, respectively. The address value and direction flag C(−) that are registered as entry 3 are discarded.

In this way, in the second preferred embodiment, if a request address does not hit and the primary cache 3 notifies the cache-miss, two addresses and direction flags are registered in the pre-fetch address queue 75.

FIGS. 11D and E show the changes caused when there is a cache access to address B from the processor unit 1 in the state shown in FIG. 11C.

In the state shown in FIG. 11C, if there is a cache access to the address B from the processor unit 1, the hit entry 3 is read, and simultaneously this entry 3 is invalid by resetting the valid bit, as shown in FIG. 11D. Since the direction flag of the read entry 3 indicates a descending direction, a descending pre-fetch request with an address B−λ as a leading address, that is, a pre-fetch request for data within the range of addresses B−λ through B−2λ+1 is output to the primary cache 3.

Simultaneous to this pre-fetch request, this address value and a direction flag B−λ(−) are registered in the pre-fetch address queue 75, as shown in FIG. 11E. In this case, the address value and direction flag E−λ(−) which were in entry 0 in FIG. 11D, the address value and direction flag E+λ(+) which were in entry 1 and the address value and direction flag A(+) which were in entry 2 are respectively shifted into entry 1, entry 2 and entry 3, which is empty.

FIG. 12 is the timing diagram of a case where there is a cache-miss in the primary cache 3 and an address is registered in the pre-fetch address queue 75.

FIG. 12 shows the changes of the following: cache-miss (control signals 9 and 49); the request address register 71; the wait bits 1 and 2 of a primary cache-miss address register 72; a primary cache-miss register read-enable (control signal 82); a primary cache-miss address write-enable (control signal 81); the address value set in each entry 42; and the address value set in the pre-fetch address register 78 that gets set when the processor unit 1 requests the primary cache 3 to access the address A in an initial state where address values and direction flags B(+), C(−), D(+) and E(+) are registered in entries 0 through 3, respectively.

In FIG. 11, if the processor unit 1 requests the primary cache 3 to read, then in cycle 2, request address A from the processor unit 1 is set in the request address register 71. Then, if the primary cache 3 notifies the pre-fetch control device 2 of a cache-miss using a control signal 9 and the write-enable signal of the primary cache-miss address register 72 is set, then in cycle 3, the pre-fetch control device 23 sets the value of the request address register 71 in the primary cache-miss register 72, and simultaneously, sets the wait bits 1 and 2.

In this way, the pre-fetch address queue control unit 40 sends a read-enable signal to the primary cache-miss address register 72. Then, in cycle 4, an address value obtained by adding block size λ to the address value A in the primary cache-miss address register 72 and a direction flag A+λ(+) are set in the entry 42-1 as entry 0. Simultaneously, the wait bit 1 of the request address register 71 is reset, and the address values and direction flags B(+), C(−) and D(+) that are set in the entries 42-1, 42-2 and 42-3, respectively, are shifted into entries 1, 2 and 3, respectively.

Since the wait bit 2 is set, in cycle 5, an address value obtained by subtracting block size λ from the address value A in the primary cache-miss address register 72 and a direction flag A−λ(−) are set in the entry 42-1 as entry 0. Simultaneously, the wait bit 2 of the request address register 71 is reset, and the address values and direction flags A+λ(+), B(+) and C(−) that are set in the entries 42-1, 42-2 and 42-3, respectively, are shifted into entries 1, 2 and 3, respectively.

In the example shown in FIG. 12, since the request address A does not hit an address value in the pre-fetch address queue 75, there is no pre-fetch request from the pre-fetch control device 2, and there is no change in the value set in the pre-fetch address register 78.

Figure 13:
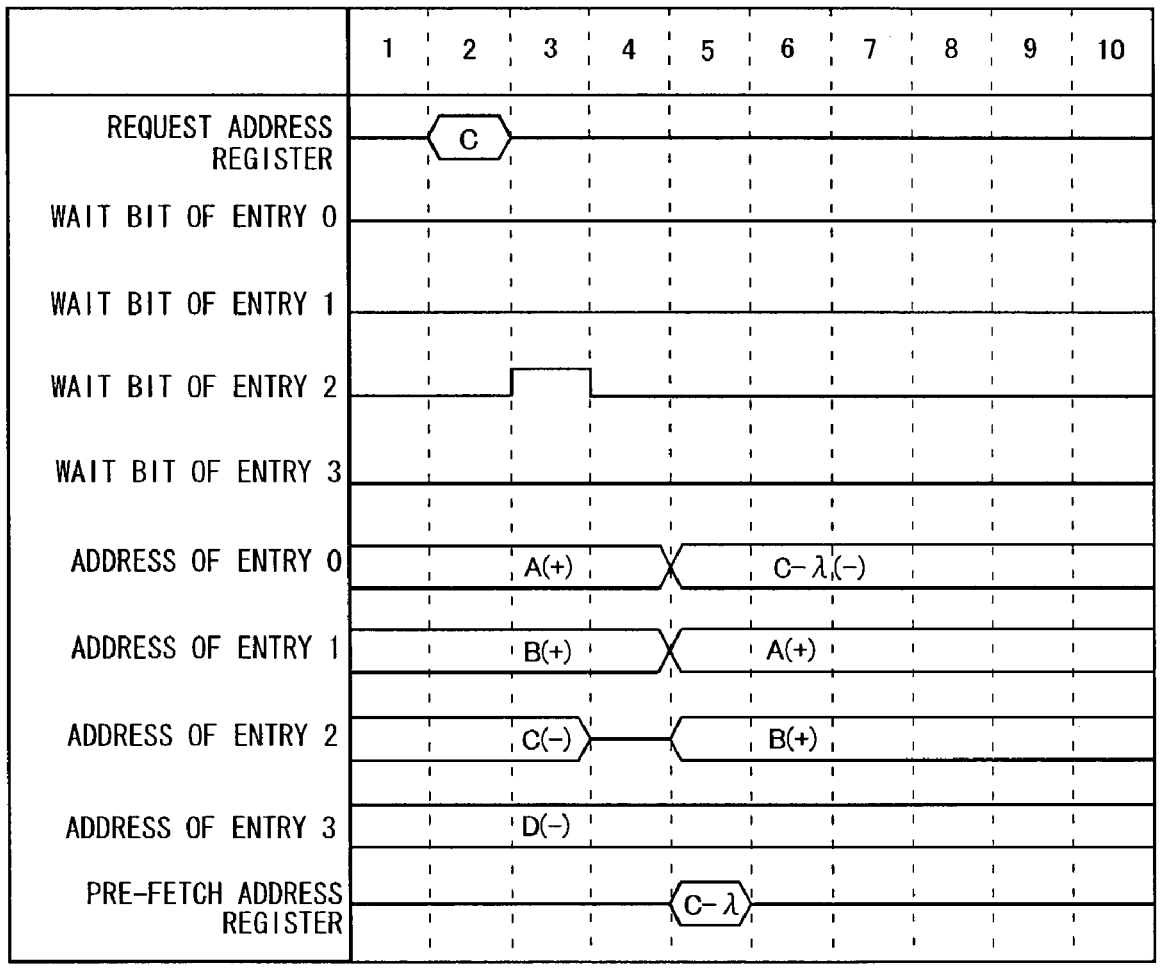
FIG. 13 is the timing diagram of a case where an address registered in a pre-fetch address queue is requested in the second preferred embodiment.

FIG. 13 is the timing diagram of a case where an address registered in the pre-fetch address queue 75 is requested.

FIG. 13 shows the changes of the following: the request address register 71; the state of wait bits in each entry 42; the address value set in each entry 42; and the address value set in the pre-fetch address register 78 that gets set when there is an access request from the processor unit 1 to the primary cache 3 using address C registered as entry 2 in an initial state where address values and direction flags A(+), B(+), C(−) and D(−) are registered as entries 0 through 3, respectively.

In FIG. 13, in cycle 2, request address C from the processor unit 1 is set in the request address register 21. Since this address C is registered in the entry 42-3, in cycle 3, the wait bit of the entry 2 is set. Then, in cycle 4, the entry 2 is invalid by resetting the valid bit.

Then, in cycle 5, an address value obtained by subtracting block size λ from the request address C in the primary cache-miss address register 22, based on the direction flag, and a direction flag C−λ(−) are set in the entry 42-1 as entry 0, and the address values and direction flags A(+) and B(+) that are set in the entries 42-1 and 42-2, respectively, are shifted into the entries 42-2 and 42-3, respectively, as entries 1 and 2. In cycle 5, an address value and a direction flag C−λ(−) are also set in the pre-fetch address register 28, and are reported to the secondary cache 4 as a pre-fetch request.

Next, the third preferred embodiment is described.

In the first and second preferred embodiments, the pre-fetch control device 2 requests the secondary cache 4 to pre-fetch a block next to an entry address registered in the pre-fetch address queue 25. However, in the third preferred embodiment, data located within the range of a plurality of blocks from a request address can be pre-fetched.

Figure 14:
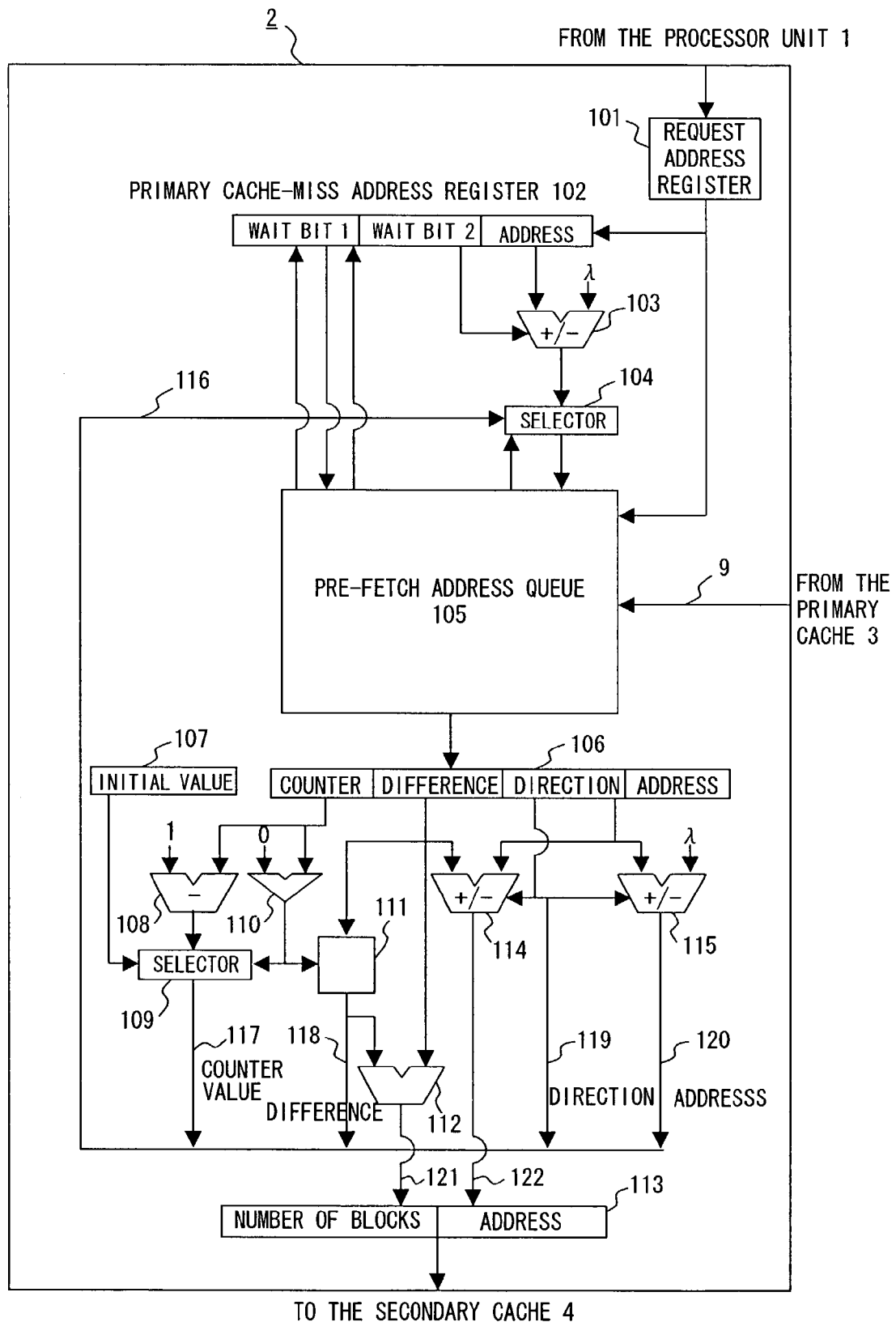
FIG. 14 shows the configuration of a pre-fetch address queue in the third preferred embodiment.
Figure 15:
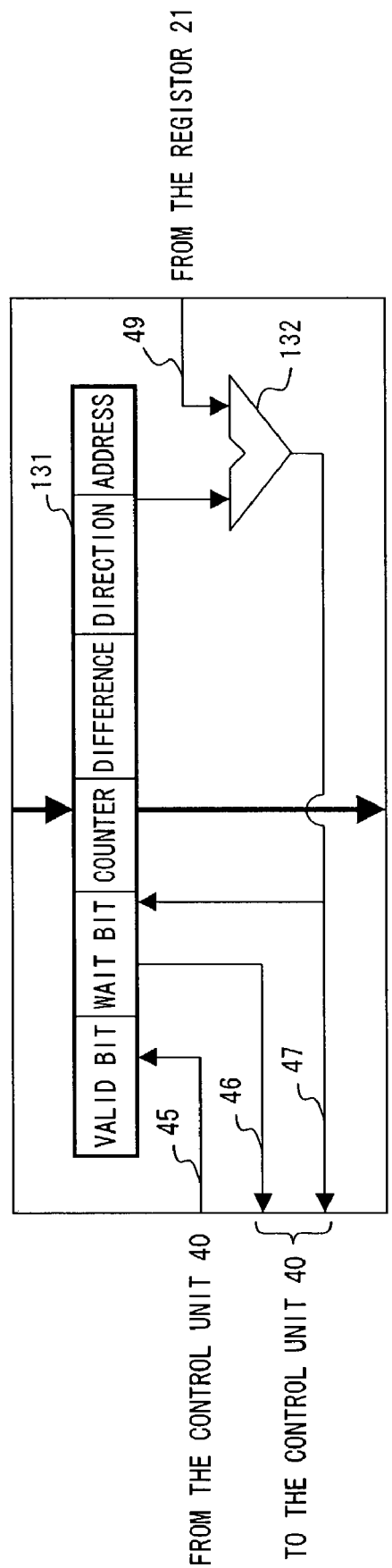
FIG. 15 shows the configuration of the entry of a pre-fetch address queue in the third preferred embodiment.

FIG. 14 shows an example of the configuration of the pre-fetch control device 2 in the third preferred embodiment. FIG. 15 shows the configuration of the entry 42 of a pre-fetch address queue 105. The configuration of the pre-fetch address queue 105 shown in FIG. 14 is basically the same as that of the pre-fetch address queue 25 shown in FIG. 4, except for the entries 42-1 through 42-4.

Compared with the configuration in the second preferred embodiment shown in FIG. 9, in the configuration of the third preferred embodiment shown in FIG. 14, a counter value and a difference value are set in the read register 106 in addition to an address value and a direction flag. The number of blocks to be pre-fetched from a pre-fetch address is also set in a pre-fetch address register 113 in addition to an address value. Specifically, the configuration of the third preferred embodiment further includes an initial value 107, calculators 108, 112, 114 and 115, a selector 109, a comparator 110 and a difference determination circuit 111, for the purpose of obtaining a counter value, a difference value, a direction and an address value which are set in a read register 106, and the number of blocks and an address value which are set in a pre-fetch address register 113.

Compared with the configuration of the entry 42 in the second preferred embodiment shown in FIG. 10, in the configuration of the entry 42 in the third preferred embodiment shown in FIG. 15, a difference value indicating the difference between a request address from the processor unit 1 and a pre-fetch address stored in the entry 42 and a counter value that is decremented every time an address hits are set in a register 131 in addition to the address value, valid bit, wait bit and direction flag that were set in the register 91 of the second preferred embodiment shown in FIG. 10. In FIG. 10, the same reference numbers are attached to the same components as those used in FIG. 5.

In this third preferred embodiment, a difference value that is added/subtracted to/from an address stored in the entry 42 when a pre-fetch address is calculated and a counter value that is decremented every time an address hits are set in the pre-fetch address queue 105 in addition to an address value and a direction flag. Then, the number of blocks to be simultaneously pre-fetched is calculated using this difference value and counter value, and pre-fetch is requested for the secondary cache 4 using these address value and number of blocks.

The operation of the pre-fetch control device 2 shown in FIG. 15 is described below.

The basic operations of the configuration of the third preferred embodiment shown in FIGS. 14 and 15, such as the registration, retrieval, reading and the like of the pre-fetch address queue 105 are the same as those of the second preferred embodiment described with reference to FIGS. 9 and 10. The configuration of the pre-fetch control device in the third preferred embodiment shown in FIG. 14 further controls the calculation of the number of blocks and controls the counter value. Only parts different from the second preferred embodiment are described below and the parts common to both embodiments are omitted.

The difference of configuration between the third embodiment shown in FIG. 15 and the second preferred embodiments is a part to perform operations form reading an entry including a hit address value in the read register 106, from the pre-fetch address queue 105, to storing an address value and a block value based on this entry in the pre-fetch address register 113 and registering the updated value in the pre-fetch address queue 105 as a new entry through a bus 116.

A pre-fetch address value to be stored in the pre-fetch address register 113 is obtained by adding/subtracting "block size λ×difference" to/from the address value of the pre-fetch address queue 105 read in the read register 106 using a calculator 114. Whether the calculator 114 should add/subtract a value depends on the state of the direction flag of the read register 106 as in the second preferred embodiment. If the direction flag indicates an ascending direction, the calculator 114 adds "block size λ×difference" to the address value. If the direction flag indicates a descending direction, the calculator 114 subtracts "block size λ×difference" from the address value. Then, the result is output. Then, this output 121 is set in the pre-fetch address register 113 as an address value.

An address value to be registered in the pre-fetch address queue 105 is obtained by adding/subtracting block size λ to/from the address value of the read register 106, based on the direction flag, using a calculator 115.

The calculator 108 decrements a counter value from an initial value set in the initial value 107 every time an entry is read from the pre-fetch address queue 105. Then, if a comparator 110 detects that the counter value is 0, a selector 109 sets the counter value back to the initial value 107.

The difference determination circuit 111 determines a new difference value. Usually, the difference determination circuit 111 outputs the difference value of the read register 106 without modification. When the comparator 110 notifies that the counter value is 0, the difference determination circuit 111 increases/outputs the difference value of the read register 106 according to a predetermined rule. An upper limit is set for a difference value, and after the value reaches the upper limit, the difference determination circuit 111 outputs the difference value without modification. In the example configuration shown in FIG. 14, if the difference determination circuit 111 is notified of the fact that the counter value is 0 and "1", "2" or "3" is inputted from the read register 106 as difference values, the difference determination circuit 111 outputs "2", "4" or "8", respectively. In this case, since "8" is, after that, "8", being the upper limit, is output as an output value even when 0 is notified.

The calculator 112 subtracts the number of blocks stored in the read register 106 from the difference value output from the difference determination circuit 111 and then outputs a value obtained by adding "1" to the difference value. Then, output 121 is set in the pre-fetch address register 113 as the number of blocks to be pre-fetched.

The pre-fetch control device 2 requests the secondary cache 4 to pre-fetch a plurality of blocks according to the number of blocks starting from the address value set in the pre-fetch address register 113. When pre-fetch is requested, designating the number of pre-fetch blocks using the number of blocks to be read prevents the occurrence of an unread block.

In this way, if an address hits a specific number of times set in the initial value 107, a block located one or more blocks away from the entry address registered in the pre-fetch address queue 105 is pre-fetched.

When the updated entry is registered in the pre-fetch address queue 105, the output 117 of the selector 109, the output 128 of the difference determination circuit 111, the value of the read register 106 and the output 120 of the calculator 115 are input into a selector 104 without modification as a counter value to be registered in the pre-fetch address queue 105, a difference value, direction information and an address value which are to be registered in the pre-fetch address queue 105, respectively, through a data bus 116. Then, the selector 104 selects/outputs data from an address bus, according to instructions from the pre-fetch address queue 105, and inputs the data to the pre-fetch address queue 105.

FIG. 16 shows the basic operation of a pre-fetching process in the third preferred embodiment.

In FIG. 16, words "DEMAND" and "PF" indicate a block, including a request address from the processor unit 1 and a block that the secondary cache 4 has pre-fetched, respectively.

In the example shown in FIG. 16, it is assumed that a counter value (=2), an address (=A), a difference (=1) and a direction flag (=(+)) are registered in the pre-fetch address queue 105 as initial entry values.

When the request address A hits, the pre-fetch control device 2 requests the secondary cache 4 to pre-fetch on condition that the pre-fetch address is A+λ and the number of blocks is 1. Then, the second cache 4 pre-fetches one block of data from the requested address A+λ from the main storage device 5 (FIG. 16A). Next, when the address A+λ hits, the pre-fetch control device 2 requests the secondary cache 4 to pre-fetch on condition that the pre-fetch address is A+2λ and the number of blocks is 1. Then, the second cache 4 pre-fetches one block of data from the requested address A+2λ from the main storage device 5 (FIG. 16B).

Furthermore, if the request address A+2λ hits, the difference determination circuit 111 modifies the difference value from 1 to 2 since the counter value of the entry read from the pre-fetch address queue 105 is 0. In this way, the pre-fetch control device 2 requests the second cache 4 to pre-fetch on condition that the pre-fetch address is A+3λ and the number of blocks is 2 (="the number of blocks outputted from the difference determination circuit 111 (2)"−"the number of blocks read from the read register 106 (1)"+1). Then, the second cache 4 pre-fetches two blocks of data from the requested address A+3λ from the main storage device 5 (FIG. 16C).

Then, when the request address A+3λ hits, the pre-fetch control device 2 requests the secondary cache 4 to pre-fetch on condition that the pre-fetch address is A+5λ(=(request address A+3λ)+difference (2)×λ) and the number of blocks is 1 (=2−2+1). Then, the second cache 4 pre-fetches one block of data from the requested address A+5λ from the main storage device 5 (FIG. 16D). Furthermore, when a request address A+4λ hits, the pre-fetch control device 2 requests the secondary cache 4 to pre-fetch on condition that the pre-fetch address is A+6λ(=(A+4λ+2×λ). Then, the second cache 4 pre-fetches one block of data from the requested address A+2λ from the main storage device 5 (FIG. 16E).

As described above, in the third preferred embodiment, if an access continues a number of times beyond the initial counter value set in the initial value 107, it is predicted that it will also be accessed in succession after that, and data for a plurality of blocks ahead of a registered address are pre-fetched. In this way, the delay of pre-fetch against the process of the processor unit 1 can be prevented.

FIG. 17 shows an example of the respective change in an address value registered in the pre-fetch address queue 105 of the third preferred embodiment.

A counter value registered in an entry is shown in the counter column of FIG. 17. A difference and a direction flag that are registered in the entry are shown in the number of blocks column. The number of blocks +α indicates an ascending pre-fetch of α blocks ahead. The number of blocks −β indicates a descending pre-fetch of β blocks ahead. Similarly, in X(α, +/−β) described below, X, α and +/−β indicate an address value, a counter value, and a difference value with a direction flag.

FIG. 17A shows the initial state of the queue. In FIG. 17A, pre-fetch addresses A(6, +4), B(0, +2), C(8, −4) and D(10, −2) are already registered as entries 0, 1, 2 and 3, respectively, of the pre-fetch address queue 105.

In the state shown in FIG. 17A, if it is notified of the cache-miss of address E in the primary cache 3, as shown in FIG. 17B, an address value obtained by adding block size λ to the address value E, an initial counter value (=16), an initial difference (=1) and an ascending direction flag E+λ (16, +1) are registered in the pre-fetch address queue 105 as entry 0. In this time, the address values and direction flags A(6, +4), B(0, +2) and C(8, −4) that are registered as entries 0 through 2, respectively, are shifted to entries 1 through 3, and D(10, −2), registered in the entry 3, is discarded.

Since request address E does not hit any address value in the pre-fetch address queue 105, as shown in FIG. 17B, an address value obtained by subtracting block size λ from the address value E, the initial counter value (=16), the initial difference value (=1) and a descending direction flag E−λ (16, −1) are registered in the pre-fetch address queue 105 in succession as entry 0. In this time, E+λ(16, +1), A(6, +4) and B(0, +2) that are registered in entries 0 through 2, respectively, are shifted to entries 1 through 3, and C(8, −4), registered in entry 3 is discarded.

In the state shown in FIG. 17C, if there is a cache access to an address A from the processor unit 1, the hit entry 2 is read, and simultaneously, this entry 2 is invalid by resetting the valid bit, as shown in FIG. 17D. Then, since the counter value and a difference value with a direction flag, in the read entry 2, are 6 and +4, respectively, a pre-fetch request on condition that the pre-fetch address is A+4λ and the number of blocks is 1, is output to the primary cache 3.

Simultaneously with this pre-fetch request, as shown in FIG. 17E, A+λ(5, +4) is registered in the pre-fetch address queue 105. In this time, an address value and a direction flag E−λ(16, −1), which were entry 0 in FIG. 17D and E+λ(16, +1), which was entry 1 in FIG. 17D, are respectively shifted to entry 1 and entry 2, which is empty.

In the state shown in FIG. 17E, if there is a cache access to address B from the processor unit 1, the hit entry 3 is read, and simultaneously, this entry 3 is invalid by resetting the valid bit, as shown in FIG. 17F. Since the counter value of the entry 3 and a difference value with a direction flag are 0 and +2, respectively, a pre-fetch request on condition that the pre-fetch address is B+2λ and the number of blocks 3, is outputs to the primary cache 3.

Simultaneously with this pre-fetch request, as shown in FIG. 17G, B+λ(16, +4) is registered in the pre-fetch address queue 105. In this time, A+λ(5, +4), which was entry 0 in FIG. 17F, E−λ(16, −1), which was entry 1 in FIG. 17F, and E+λ(16, +1), which was entry 2 in FIG. 17F, are respectively shifted to entry 1, entry 2 and entry 3, which is empty.

FIG. 18 is the timing drawing of a case where there is a cache-miss in the primary cache 3 and an address is registered in the pre-fetch address queue 105 in the third preferred embodiment.

FIG. 18 shows the changes of the following: cache-miss (control signal 9); a request address register 101; the wait bits 1 and 2 of a primary cache-miss address register 102; a primary cache-miss address register read-enable; a primary cache-miss register write-enable; an address value set in each entry 42; and an address value set in the pre-fetch address register 113 that gets set when the processor unit 1 requests the primary cache 3 to access address A, in an initial state where an address value, a counter value, a difference value and direction flags B(1, +1), C(4, −2), D(1, +4) and E(6, +2) are registered in entries 0 through 3, respectively.

Figure 19:
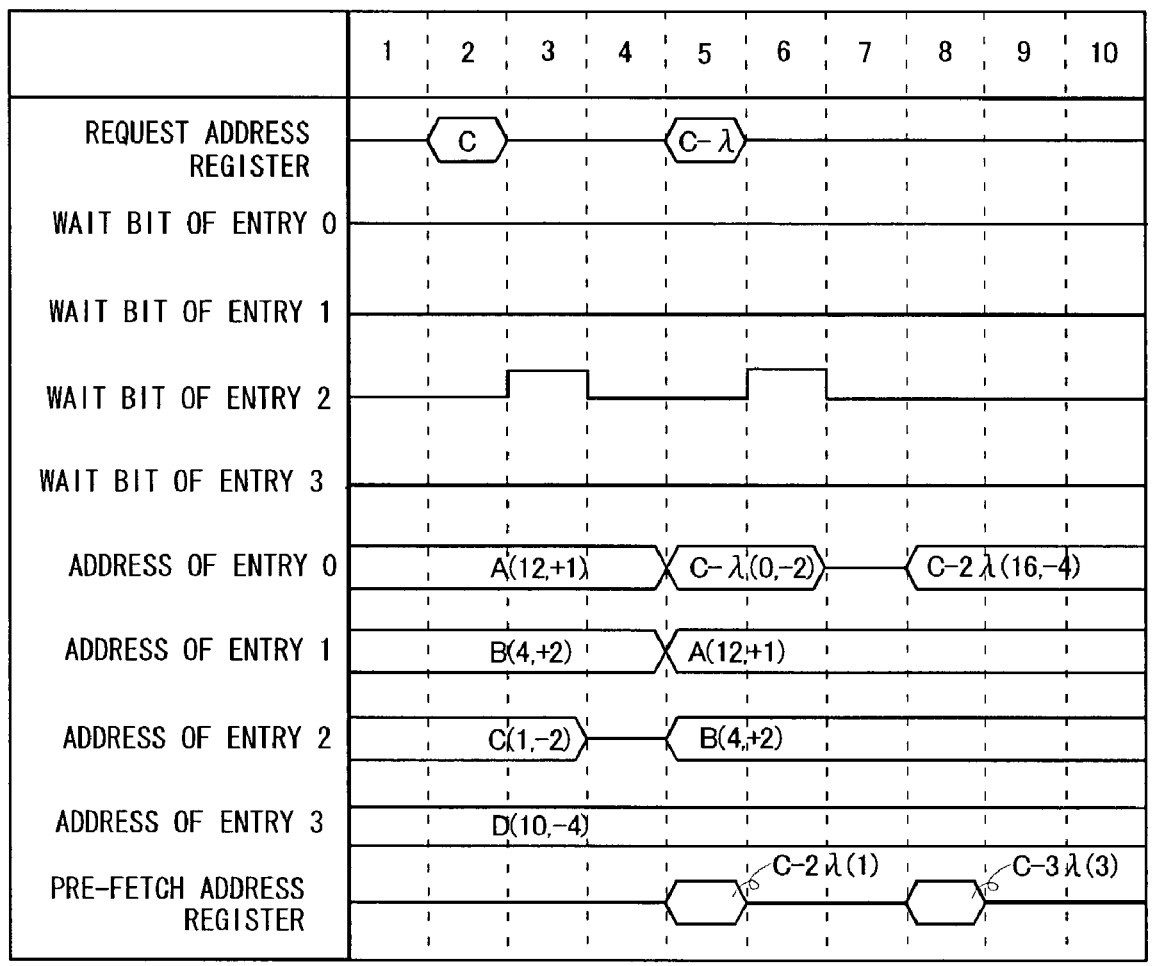
FIG. 19 is the timing diagram of a case where an address registered in a pre-fetch address queue is requested in the third preferred embodiment.

FIG. 19 is the timing drawing of a case where an address registered in the pre-fetch address queue 105 is requested.

FIG. 19 shows the respective change of the request address register 101, the wait bit state of each entry 42, a value set in each entry 42 and an address value set in the pre-fetch address register 113 that gets set when there is an access request from the processor unit 1 to the primary cache 3 using an address C registered as entry 2 in an initial state where an address value, counter values, difference values and direction flags B(1, +1), C(4, −2), D(1, +4) and E(6, +2) are registered as entries 0 through 3, respectively.

Compared with the timing drawings of the second preferred embodiment shown in FIGS. 12 and 13, the timing diagrams of the third preferred embodiment shown in FIGS. 18 and 19 are the same as those of the second preferred embodiment except for the contents set in the entry 42.

In this third preferred embodiment, when entry address hits, a counter is decremented for every pre-fetch request. When the counter becomes 0, the counter is reset to its initial value and the difference value is increased. Therefore, the greater is the number of hits, the farther away from a request address is pre-fetched data. Accordingly, the blocks to be pre-fetched can be prevented from being accessed until the data of the blocks is obtained after the pre-fetch is requested.

Next, the fourth preferred embodiment is described.

The fourth preferred embodiment corresponds to a case where the main storage device 5 is shared by a plurality of CPUs.

If memory is shared by a plurality of CPUs, there is the problem of cache coherency (consistency in contents between a memory and the cache of each CPU).

In the fourth preferred embodiment, the pre-fetch control device 2 comprises a mechanism for preserving cache coherency.

When data is read, usually there is no problem of consistency. However, when data is written, it must be controlled so that there is no mismatch in cache data between the relevant CPU and another CPU.

As such a control method, a method preserving a cache coherency by ensuring that the data of the address to be written to is not had in any other CPU' cache when a specific CPU writes data, is used.

According to this method, when a CPU writes data, its cache must be in a writable state (state where there is no same data in another CPU). This method usually takes a long time.

Therefore, in this preferred embodiment, if writing is anticipated, a cache must pre-fetched on the write-enable state. In this way, the pre-fetch of this preferred embodiment can give full play to its ability for writing data, too. In this case, if data is pre-fetched in a writable state, another CPU loses the data. Therefore, if this measure is overdone, since another CPU loses the pre-fetched data, the miss ratio of a cache increases. For this reason, a pre-fetch type is predicted as follows.

Figure 20:
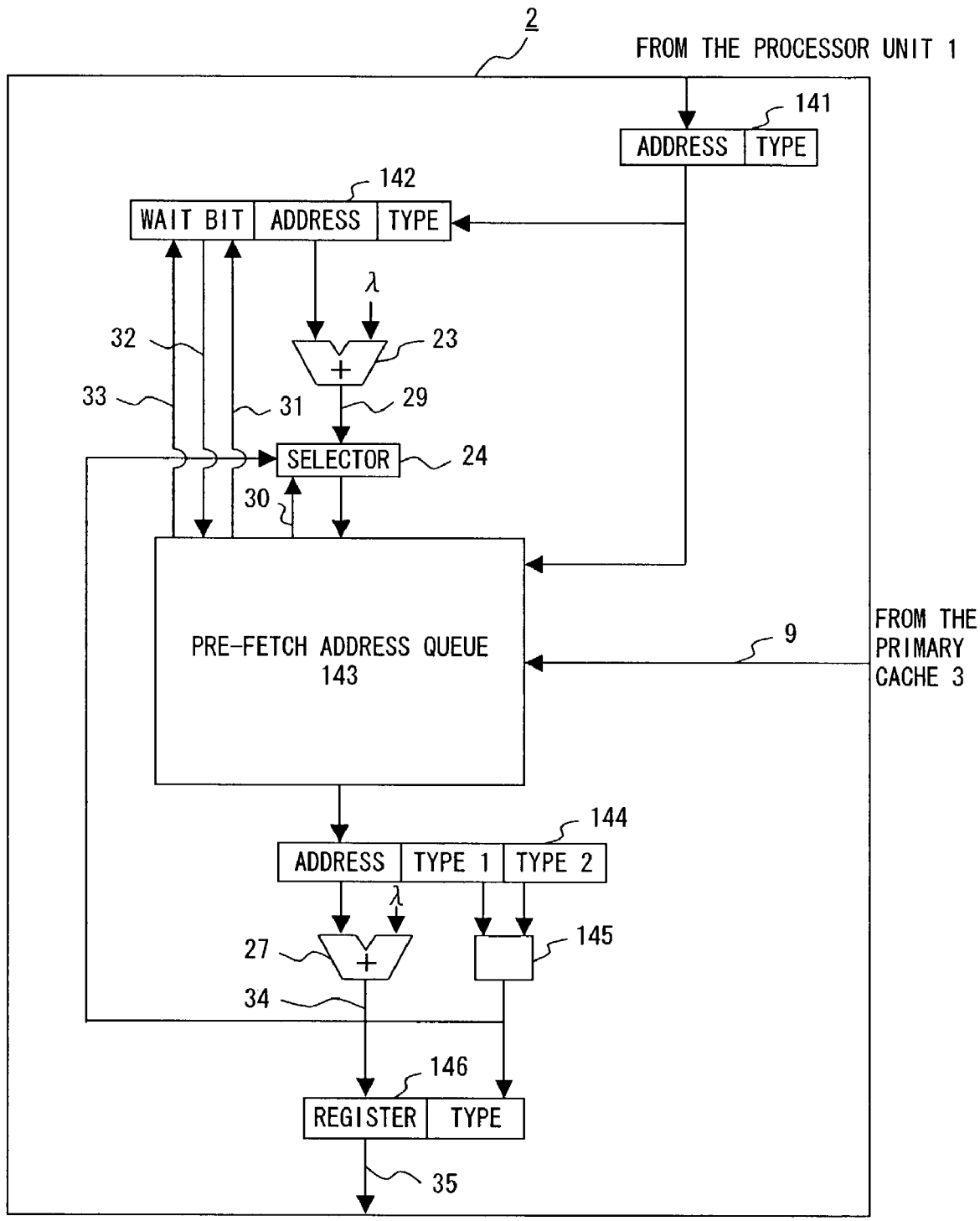
FIG. 20 shows the configuration of a pre-fetch control device in the fourth preferred embodiment.

FIG. 20 shows the configuration of a pre-fetch control device 2 in the fourth preferred embodiment.

The pre-fetch control device 2 shown in FIG. 20 is built based on the pre-fetch control device 2 in the first preferred embodiment shown in FIG. 3. However, the pre-fetch control device 2 in the fourth preferred embodiment can also be built based on that of the second or third preferred embodiment.

Compared with the pre-fetch control device 2 of the first preferred embodiment shown in FIG. 3, that of the fourth preferred embodiment shown in FIG. 20 further comprises a predictor 145. Type information indicating whether this request address is for a read or write request can be set in a request address register 141, a primary cache-miss address register 142 and a read register 144 in addition to an address value. This type information can also be set in the entry 42 of the pre-fetch address queue 143.

FIG. 21 shows the configuration of the entry of the pre-fetch address queue 143 in the fourth preferred embodiment.

In the configuration shown in FIG. 21, two types of type information; types 1 and 2, can be set in a register 151. In type 1, the type information of the primary cache-miss register 142 can be set. While in type 2, when the address value of a register hits, type information about whether the hit request address is for a read or write request, can be set.

In FIG. 21, a comparator 62 compares a request address from the request address register 141 with the address of the register 151. If they are the same, the type information of the request address register 141 is set in the register 142 as type 2 through a calculator 152. In this case, if data is read from this entry 42, two types of type information, types 1 and 2, are also read together with an address value and are set in the read register 144.

The types 1 and 2 can be set in the read register 144 in addition to an address value. The types 1 and 2 that have been set in the read register 144 are input to the predictor 145. The predictor 145 selects a type to be set in the pre-fetch address register 145 from types 1 and 2. If types 1 and 2 are both write requests, the predictor 145 predicts that there will be a write request and sets a write request in the pre-fetch address register 143 as its type. Otherwise, the predictor 145 sets a read request in the pre-fetch address register 143 as its type. When the address value is written back into the pre-fetch address queue 143, the output of the predictor 145 is set in the pre-fetch address queue 143 as type 1 together with the address value.

The pre-fetch control device 2 requests the secondary cache 4 to pre-fetch data based on the address value and type information that are set in the fetch address register 145. If the type information is a write request, the secondary cache 4 pre-fetches data in a writable state.

In this way, it can be predicted whether writing will be conducted for the data to be pre-fetched and the data can be pre-fetched in a writable state, based on the prediction.

Next, the fifth preferred embodiment is described.

In the fifth preferred embodiment, the pre-fetch control device 2 further comprises a mechanism for handling a plurality of simultaneous accesses.

The processor unit 1 does not always request one data. Sometimes, the processor unit 1 simultaneously makes a plurality of accesses.

The fifth preferred embodiment is applied to such a case.

Figure 22:
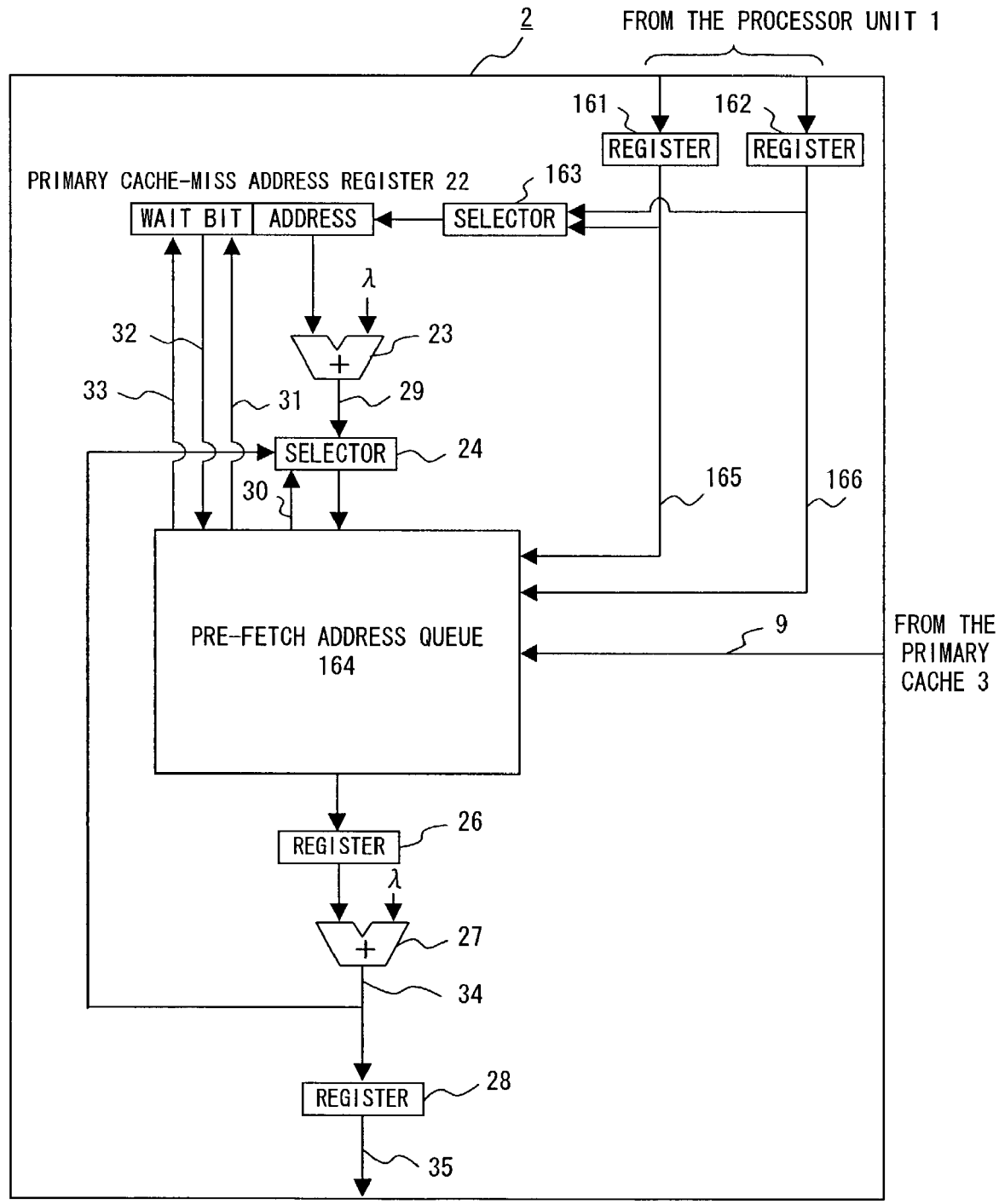
FIG. 22 shows the configuration of a pre-fetch control device in the fifth preferred embodiment.

FIG. 22 shows the configuration of a pre-fetch control device in the fifth preferred embodiment.

The pre-fetch control device in the fifth preferred embodiment shown in FIG. 22 is built based on the pre-fetch control device 2 in the first preferred embodiment. However, the pre-fetch control device can also be realized based on the second or third preferred embodiment.

Compared with the configuration in the first preferred embodiment shown in FIG. 3, the configuration in the fifth preferred embodiment shown in FIG. 22 further comprises the first and second request address registers 161 and 162, and a selector 163 selecting an address value from one of two request address registers 161 and 162, and setting the selected address value to the primary cache-miss address register 22.

A request address from the processor unit 1 is set in the first request address register 161 or the second request address register 162, and this address value is compared with the pre-fetch address set in a pre-fetch address queue 164. A selector 163 switches over these two registers 161 and 162 and sets the address value in a primary cache-miss address register 22.

The pre-fetch address queue 164 has a structure for simultaneously comparing the address of either of the two request address registers 161 and 162 with the entry address values set in its own entry.

Figure 23:
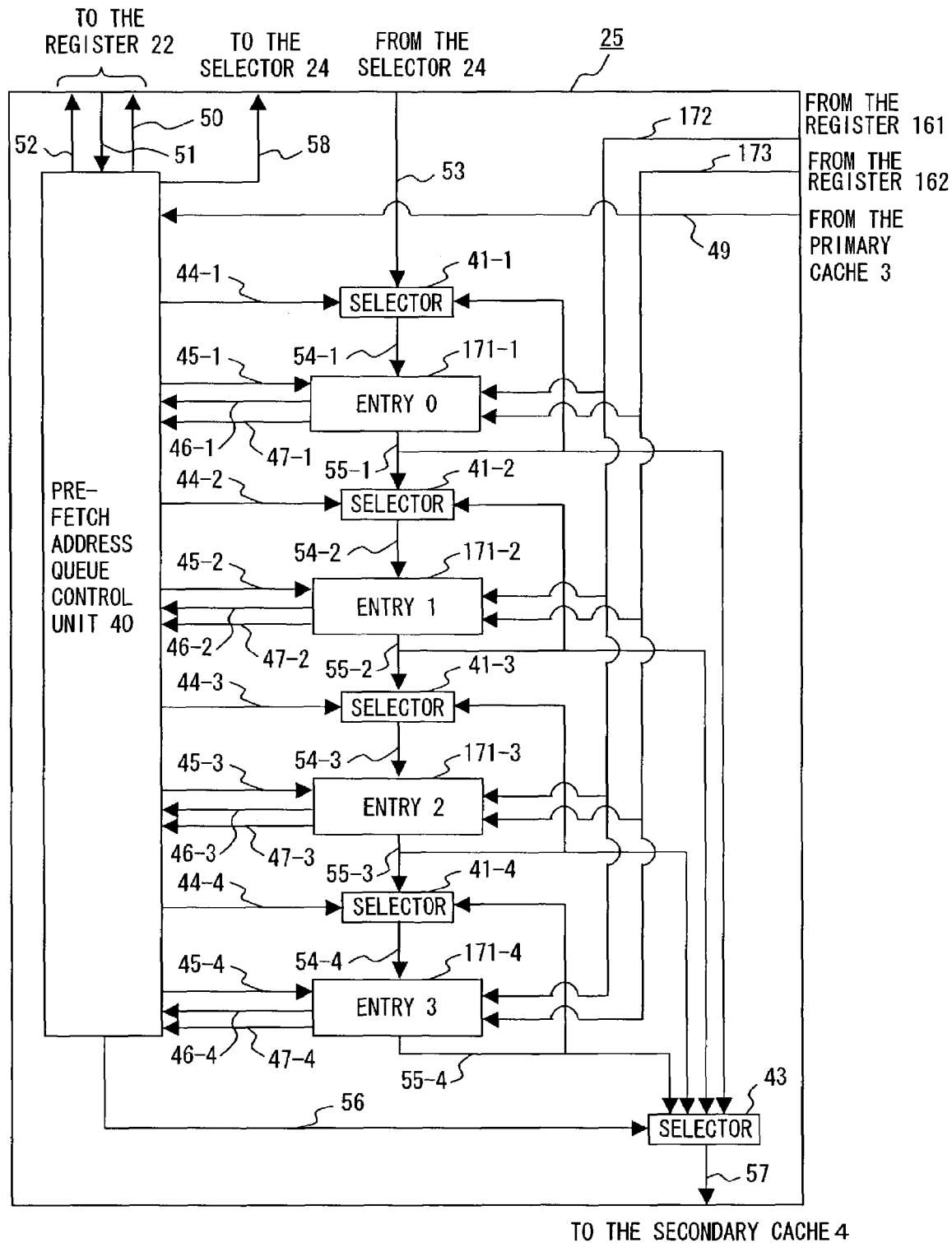
FIG. 23 shows the configuration of the entry of a pre-fetch address queue in the fifth preferred embodiment.

FIG. 23 shows the configuration of the pre-fetch address queue 164.

The pre-fetch address queue 164 shown in FIG. 23 further comprises a data bus 172 through which the request address value from the first request address register 161 is input and a data bus 173 through which the request address value from the second request address register 162 is input. These two data buses 172 and 173 are input to all entries 171-1 through 171-4.

Figure 24:
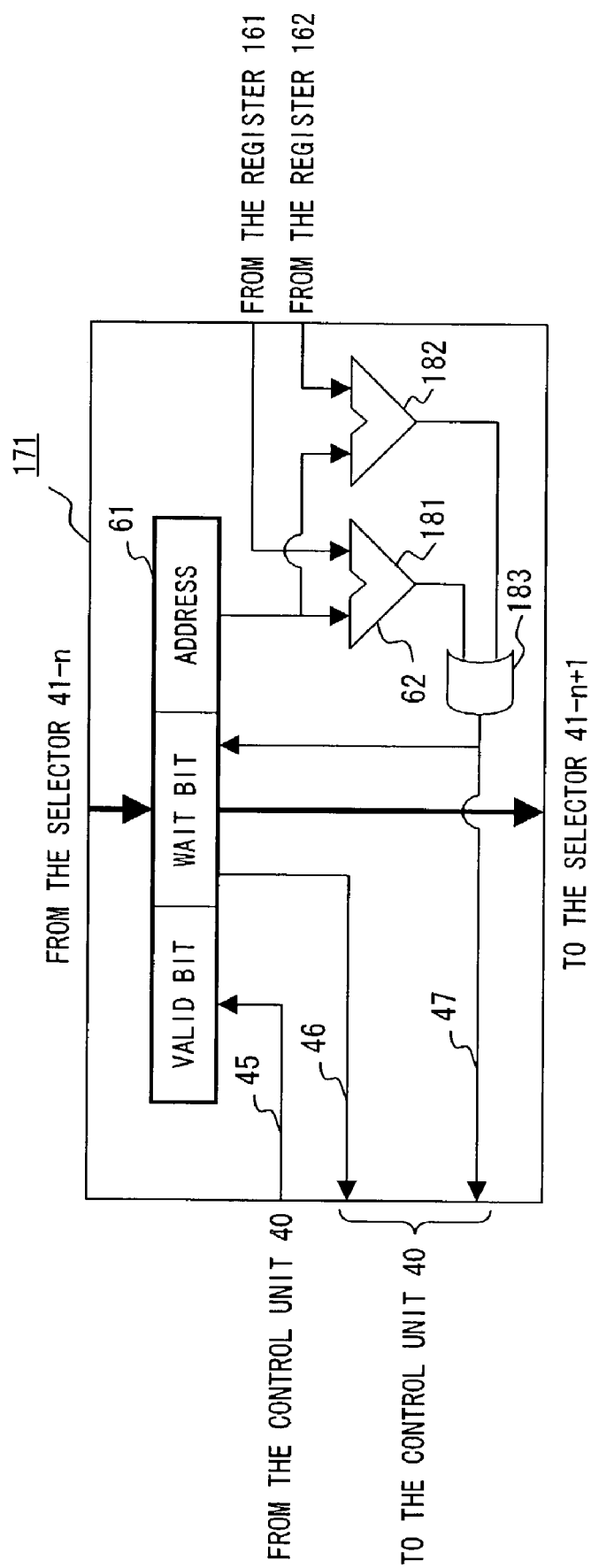
FIG. 24 shows the configuration of the entry of a pre-fetch address queue in the fifth preferred embodiment.

FIG. 24 shows the configuration of an entry 171.

The entry 171 further comprises a comparator 181 comparing the request address from the first request address register 161 with the address value of the entry address set in the register 61 and a comparator 182 comparing the request address value from the second request address register 162 with the address value of the entry address set in the register 61. These two request addresses can be simultaneously compared.

In the fifth preferred embodiment with the configurations shown in FIGS. 22, 23 and 24, the processor unit 1 can simultaneously handle a plurality of request addresses.

Although in the above description, the pre-fetch control device has requested the secondary cache 4 to pre-fetch data and has stored the pre-fetched data in the secondary cache 4, it is not limited to the secondary cache 4 that pre-fetches data in the preferred embodiment. Alternatively, the pre-fetch control device can request the primary cache 3 to pre-fetch data and store the pre-fetched data in the primary cache 3. If there is a tertiary cache or a cache in a lower order, the pre-fetch control device can request such a cache to pre-fetch data and store the pre-fetched data in the cache.

According to the present invention, pre-fetch based on a highly accurate prediction can be realized. Accordingly, efficient and effective pre-fetch can be realized.

A series of areas can be pre-fetched, and if access to the areas is stopped, no more areas cannot be pre-fetched in succession.

Furthermore, data can be pre-fetched for access not only in ascending order of address, but also in descending order.

Data located ahead of a plurality of blocks from a request address can also be pre-fetched.

Furthermore, even when memory is shared by a plurality of data processing apparatuses, whether data should be pre-fetched in a writable state can be instructed for cache means. Therefore, cache coherency can be preserved with little degradation of performance.

Pre-fetch addresses can also be simultaneously predicted for two different cache accesses.

What is claimed is:

1. A data processing apparatus, comprising;
    a cache memory unit;
    an address registration queue registering an address value of a memory that has a possibility of being previously accessed; and
    a pre-fetch request unit comparing between a request address for which an access was previously requested and the address value registered in the address registration queue and requesting the cache memory unit to pre-fetch data, based on a result of the comparison.

2. A pre-fetch control device that is used in a data processing apparatus with a cache memory unit, comprising;
    an address registration queue registering an address value of a memory that has a possibility of being previously accessed; and
    a pre-fetch request unit comparing between a request address for which an access was previously requested and the address value registered in the address registration queue and requesting the cache memory unit to pre-fetch data, based on a result of the comparison.

3. The pre-fetch control device according to claim 2, wherein said pre-fetch request unit requests said cache memory unit to pre-fetch data by providing a pre-fetch address calculated from the address value.

4. The pre-fetched control unit according to claim 3, wherein the data processing device pre-fetches data in units of blocks of a specific size and said pre-fetch request unit calculates the pre-fetch address using the address value and the specific size.

5. The pre-fetch control device according to claim 4, wherein the specific size is equivalent to one line of the cache memory unit.

6. The pre-fetch control device according to claim 3, wherein said address registration queue registers difference value information indicating a difference between the request address and the pre-fetch address in relation to the address value.

7. The pre-fetch control device according to claim 2, wherein said processing apparatus further comprises a higher-order cache memory unit, which is ordered higher than the cache memory unit.

8. The pre-fetch control device according to claim 2, wherein said higher-order cache memory unit is primary cache memory, and said cache memory unit is secondary cache memory.

9. A pre-fetch control device that is used in a data processing apparatus with a cache memory unit, comprising;
   an address registration queue registering an address value of a memory that has a possibility of being previously accessed;
   a pre-fetch request unit requesting the cache memory unit to pre-fetch data, based on a result of a comparison between a request address for which an access was previously requested and the address value registered in the address registration queue;
   a pre-fetch request unit requesting the cache memory unit to pre-fetch data, based on a result of a comparison between a request address for which an access was previously requested and the address value registered in the address registration queue, where said pre-fetch request unit requests said cache memory unit to pre-fetch data by providing a pre-fetch address calculated from the address value; and a registration unit registering an address value obtained by processing the address value read from said address registration queue.

10. A pre-fetch control device that is used in a data processing apparatus with a cache memory unit, comprising;
   an address registration queue registering an address value of a memory that has a possibility of being previously accessed; and
   a pre-fetch request unit requesting the cache memory unit to pre-fetch data, based on a result of a comparison between a request address for which an access was previously requested and the address value registered in the address registration queue, and
   wherein when there is a miss-hit in a higher-order cache unit, which is ordered higher than said cache memory unit, said address registration queue registers an address value based on a miss-hit address.

11. A pre-fetch control device that is used in a data processing apparatus with a cache memory unit, comprising;
   an address registration queue registering an address value of a memory that has a possibility of being previously accessed; and
   a pre-fetch request unit requesting the cache memory unit to pre-fetch data, based on a result of a comparison between a request address for which an access was previously requested and the address value registered in the address registration queue, and
   wherein said address registration queue registers a direction flag indicating a pre-fetching direction in relation to the address value, and said pre-fetch request unit calculates a pre-fetch address, based on the address and the direction flag and issues a pre-fetch request.

12. A pre-fetch control device that is used in a data processing apparatus with a cache memory unit, comprising;
   an address registration queue registering an address value of a memory that has a possibility of being previously accessed; and
   a pre-fetch request unit requesting the cache memory unit to pre-fetch data, based on a result of a comparison between a request address for which an access was previously requested and the address value registered in the address registration queue, and
   wherein said address registration queue registers a plurality of the address values, and when registering a new address value, said address registration queue replaces the address value with a new address value, based on the order of registering the plurality of address values.

13. The pre-fetch control device according to claim 12, wherein said pre-fetch request unit issues the pre-fetch request by providing the pre-fetch address and a size of data to be pre-fetched.

14. The pre-fetch control device according to claim 13, wherein the size of data to be pre-fetched is determined based on the difference information.

15. The pre-fetch control device according to claim 13, wherein said address registration queue registers a counter value obtained when a related address value is the same as the request address as the result of the comparison of said pre-fetch request unit, in relation to the address value, and when the counter value is a specific value, said address registration queue modifies the difference information.

16. A pre-fetch control device that is used in a data processing apparatus with a cache memory unit, comprising;
   an address registration queue registering an address value of a memory that has a possibility of being previously accessed;
   a pre-fetch request unit requesting the cache memory unit to pre-fetch data, based on a result of a comparison between a request address for which an access was previously requested and the address value registered in the address registration queue, and
   wherein said address registration queue registers first type information indicating whether the address value is for a write request in relation to the address value, and the pre-fetch request includes second type information about whether the pre-fetch request is for a write request based on the first type information.

17. The pre-fetch control device according to claim 16, wherein the second type information is determined based on the first type information and third type information indicating that the request address is for a write request.

18. The pre-fetch control device according to claim 17, wherein after the pre-fetch request has been issued, the third type information is registered in said address registration queue in relation to the address value as the first type information.

19. The pre-fetch control device according to claim 18, wherein said pre-fetch request unit further comprises a comparison unit comparing a plurality of the request addresses with the address value, and simultaneously generates a plurality of pre-fetch requests, based on the plurality of the request addresses.

20. A pre-fetch control device that is used in a data processing apparatus with a cache memory unit, comprising;

an address registration queue registering an address value of a memory that has a possibility of being previously accessed; and a pre-fetch request unit requesting the cache memory unit to pre-fetch data, based on a result of a comparison between a request address for which an access was previously requested and the address value registered in the address registration queue, and wherein said processing apparatus further comprises a higher-order cache memory unit, which is ordered higher than the cache memory unit and said pre-fetch request unit issues a pre-fetch request to said cache memory unit, based on a result of comparison between an address using which said higher-order cache memory unit was previously accessed and an address value stored in said address storage unit.

21. A pre-fetch control device that is used in a data processing apparatus with a cache memory, comprising:

a request address register storing a request address based on a request for access to the cache memory;

a primary cache-miss address register storing an address value in the request address register;

a first calculator adding a specific value to the address value of the primary cache-miss address register and outputting the result;

a pre-fetch address queue with a plurality of entries each storing an address value as an entry address, comparing the request address of the request address register with respective entry addresses of the plurality of entries, and if the request address and an entry address are the same, outputting the entry address;

a read register storing output of the pre-fetch address queue;

a second calculator adding the specific value to the entry address of the read register and outputting the result; and a registration unit registering outputs of the first and second calculators in one of the plurality of entries of the pre-fetch address queue as an entry address.

22. A pre-fetch control device that is used in a data processing apparatus with a cache memory, comprising:

a request address register storing a request address based on a request for access to the cache memory;

a primary cache-miss address register storing an address value of the request address register;

a first calculator adding/subtracting a specific value to/from the address value of the primary cache-miss address register, according to instructions and outputting the added/subtracted address value;

a pre-fetch address queue with a plurality of entries each storing an address value as an entry address together with a direction flag indicating a pre-fetching direction, comparing the request address of the request address register with respective entry addresses of the plurality of entries, and if the request address and an entry address are the same, outputting the entry address together with the direction flag;

a read register storing output of the pre-fetch address queue;

a second calculator adding/subtracting the specific value to the entry address of the read register, based on a value of the direction flag and outputting the result;

a first registration unit instructing the first calculator to add a value and registering the output of the first calculator as an entry address in one of the plurality of entries together with the direction flag indicating an ascending pre-fetching direction, and simultaneously instructing the first calculator to subtract a value and registering output of the first calculator as an entry address in one of the plurality of entries together with the direction flag indicating a descending pre-fetching direction; and a second registration unit registering output of the second calculator in one of the plurality of entries as the entry address together with a direction flag of the read register.

23. A pre-fetch control device that is used in a data processing apparatus with a cache memory, comprising:

a request address register storing a request address based on a request for an access to the cache memory;

a primary cache-miss address register storing an address value of the request address register;

a first calculator adding/subtracting a specific value to/from the address value of the primary cache-miss address register, according to instructions and outputting the result;

a pre-fetch address queue with a plurality of entries each storing the address value as an entry address together with difference value information indicating the difference between the request address and a pre-fetch address designating a pre-fetching position, a counter value and a direction flag indicating a pre-fetching direction, comparing a request address of the request address register with respective entry addresses of the plurality of entries, and if the request address and an entry address are the same, outputting the entry address together with the difference information, the counter value and the direction flag;

a read register storing output of the request address queue;

a second calculator adding/subtracting a specific value to/from the entry address of the read register, based on the value of the direction flag;

counter value calculation unit for decrementing a counter value of the read register, and outputting an initial value as a counter value if the counter value becomes a specific value and outputting the decremented value as a counter value if the counter value does not become the specific value;

a difference information determination unit modifying and outputting difference information of the read register according to a predetermined rule if the counter value of the read register is the specific value, and outputting the difference information of the read register without modifications if the counter value is not the specific value;

a pre-fetch address calculation unit for calculating the pre-fetch address, based on the difference information, the direction flag and the address value of the read register;

a first registration unit instructing the first calculator to add a value and registering the counter value set to the initial value, the difference value and output of the first calculator in one of the plurality of entries as an entry address together with a direction flag indicating an ascending pre-fetching direction, and simultaneously instructing the first calculator to subtract a value and registering the counter value set to the initial value, the difference value and output of the first calculator in one of the plurality of entries as an entry address together with a direction flag indicating a descending pre-fetching direction; and a second registration unit registering the counter value output from the counter value calculation unit, the difference value output from the difference information determination unit, and output of the second calculator in one of the plurality of entries as the entry address together with the direction flag of the read register.

24. A pre-fetch control device that is used in a data processing apparatus with a cache memory, comprising:
   a request address register storing a request address based on a request for access to the cache memory together with first type information indicating whether the request address is for a write request;
   a primary cache-miss address register storing the address value and first type information of the request address register;
   a first calculator adding a specific value to the address value of the primary cache-miss address register and outputting the result;
   a pre-fetch address queue with a plurality of entries each storing an address value as an entry address together with the first type information, comparing the request address of the request address register with respective entry addresses of the plurality of entries, and if the request address and an entry address are the same, outputting the entry address together with the first type information;
   a read register storing output of the pre-fetch address queue;
   a second calculator adding the specific value to the entry address of the read register and outputting the result;
   a predictor determining second type information indicating whether a pre-fetch request is for a write pre-fetch request, based on the first type information of the read register and the first type information of the request address register; and
   a registration unit registering the output of the first calculator and the first type information of the first cache-miss address register, and the output of the second calculator and the second type information output from the predictor in one of the plurality of entries of the pre-fetch address queue, as the entry address and the first type information, respectively.

25. A pre-fetch control device that is used in a data processing apparatus with a cache memory, comprising:
   a plurality of request address registers each storing a request address based on a request for access to the cache memory;
   a selector selecting and outputting one of respective request addresses of the plurality of request address registers;
   a primary cache-miss address register storing an address output from the selector;
   a first calculator adding a specific value to the address value of the primary cache-miss address register and outputting the result;
   a pre-fetch address queue with a plurality of entries each storing an address value as an entry address, comparing the respective request addresses of the plurality of request address registers with respective entry addresses of the plurality of entries, and if a request address and an entry address are the same, outputting the entry address;
   a read register storing output of the pre-fetch address queue;
   a second calculator adding the specific value to the entry address of the read register and outputting the result;
   a pre-fetch address register storing output of the second calculator; and
   a registration unit registering the outputs of the first and second calculators in one of the plurality of entries of the pre-fetch address queue as pre-fetch address.

26. A data processing apparatus, comprising;
   cache memory means;
   address registration queue means for registering an address value of a memory that has a possibility of being previously accessed; and
   pre-fetch request means for comparing a request address for which an access was previously requested and the address value registered in the address registration means and requesting the cache memory means to pre-fetch data, based on a result of the comparison.

27. A pre-fetch control device that is used in a data processing apparatus with cache memory means, comprising;
   address registration queue means for registering an address value of a memory that has a possibility of being previously accessed; and
   pre-fetch request means for comparing a request address for which an access was previously requested and the address value registered in the address registration means and requesting the cache memory means to pre-fetch data, based on a result of the comparison.

28. A pre-fetch control device that is used in a data processing apparatus with a cache memory, comprising:
   request address register means for storing a request address based on a request for an access to the cache memory;
   primary cache-miss address register means for storing an address value of the request address register means;
   first calculator means for adding a specific value to the address value of the primary cache-miss address register means and outputting the result;
   pre-fetch address queue means with a plurality of entries each storing an address value as an entry address, comparing the request address of the request address register means with respective entry addresses of the plurality of entries, and if the request address and an entry address are the same, outputting the entry address;
   read register means for storing output of the pre-fetch address queue means;
   second calculator means for adding the specific value to the entry address of the read register means and outputting the result; and
   registration means for registering outputs of the first and second calculator means in one of the plurality of entries of the pre-fetch address queue means as an entry address.

29. A pre-fetch control device that is used in a data processing apparatus with a cache memory, comprising:
   request address register means for storing a request address based on a request for an access to the cache memory;
   primary cache-miss address register means for storing an address value of the request address register means;
   first calculator means for adding/subtracting a specific value to/from the address value of the primary cache-miss address register means, according to instructions and outputting the result;
   pre-fetch address queue means with a plurality of entries each storing an address value as an entry address together with a direction flag indicating pre-fetching direction, comparing the request address of the request address register means with respective entry addresses of the plurality of entries, and if the request address and an entry address are the same, outputting the entry address together with the direction flag;
read register means storing output of the pre-fetch address queue means;
second calculator means for adding/subtracting the specific value to the entry address of the read register means, based on a value of the direction flag and outputting the result;
first registration means for instructing the first calculator means to add a value and registering the output of the first calculator means as an entry address in one of the plurality of entries together with the direction flag indicating an ascending pre-fetching direction, and simultaneously instructing the first calculator means to subtract a value and registering output of the first calculator means as an entry address in one of the plurality of entries together with the direction flag indicating a descending pre-fetching direction; and
second registration means for registering output of the second calculator means in one of the plurality of entries as an entry address together with the direction flag of the read register means.

30. A pre-fetch control device that is used in a data processing apparatus with a cache memory, comprising:
request address register means for storing a request address based on a request for an access to the cache memory;
primary cache-miss address register means for storing an address value of the request address register means;
first calculator means for adding/subtracting a specific value to/from the address value of the primary cache-miss address register means, according to instructions and outputting the result;
pre-fetch address queue means with a plurality of entries each storing an address value as an entry address together with the difference value information indicating difference between the request address and a pre-fetch address designating a pre-fetching position, a counter value and a direction flag indicating a pre-fetching direction, comparing a request address of the request address register means with respective entry addresses of the plurality of entries, and if the request address and an entry address are the same, outputting the entry address together with the difference information, the counter value and the direction flag;
read register means storing output of the request address queue means;
second calculator means adding/subtracting a specific value to/from the entry address of the read register means, based on a value of the direction flag;
counter value calculation means for decrementing a counter value of the read register means, and outputting an initial value as a counter value if the counter value becomes a specific value and outputting the decremented value as a counter value if the counter value does not become the specific value;
difference information determination means for modifying and outputting difference information of the read register means according to a predetermined rule if the counter value of the read register means is the specific value, and outputting the difference information of the read register means without modifications if the counter value is not the specific value;
pre-fetch address calculation means for calculating the pre-fetch address, based on the difference information, the direction flag and the address value of the read register means;
first registration means for instructing the first calculator means to add a value and registering the counter value set to the initial value, the difference value and output of the first calculator means in one of the plurality of entries as an entry address together with a direction flag indicating an ascending pre-fetching direction, and simultaneously instructing the first calculator means to subtract a value and registering the counter value set to the initial value, the difference value and output of the first calculator means in one of the plurality of entries as an entry address together with a direction flag indicating a descending pre-fetching direction; and
second registration means for registering the counter value output from the counter value calculation means, the difference value output from the difference information determination means and output of the second calculator means in one of the plurality of entries as the entry address together with the direction flag of the read register means.

31. A pre-fetch control device that is used in a data processing apparatus with a cache memory, comprising:
request address register means for storing a request address based on a request for an access to the cache memory together with first type information indicating whether the request address is for a write request;
primary cache-miss address register means for storing the address value and first type information of the request address register means;
first calculator means for adding a specific value to the address value of the primary cache-miss address register means and outputting the result;
pre-fetch address queue means with a plurality of entries each storing an address value as an entry address together with the first type information, comparing the request address of the request address register means with respective entry addresses of the plurality of entries, and if the request address and an entry address are the same, outputting the entry address together with the first type information;
read register means storing output of the pre-fetch address queue means;
second calculator means for adding the specific value to the entry address of the read register means and outputting the result;
predictor means for determining second type information indicating whether a pre-fetch request is for a write pre-fetch request, based on the first type information of the read register means and the first type information of the request address register means; and
registration means for registering the output of the first calculator means and the first type information of the first cache-miss address register means, and the output of the second calculator means and the second type information output from the predictor means in one of the plurality of entries of the pre-fetch address queue means, as the entry address and the first type information, respectively.

32. A pre-fetch control device that is used in a data processing apparatus with a cache memory, comprising:
a plurality of request address register means each for storing a request address based on a request for an access to the cache memory;
selector means for selecting and outputting one of respective request addresses of the plurality of request address register means;
primary cache-miss address register means for storing an address output from the selector means;

first calculator means for adding a specific value to the address value of the primary cache-miss address register means and outputting the added address value;

pre-fetch address queue means with a plurality of entries each storing an address value as an entry address, comparing the respective request addresses of the plurality of request address register means with respective entry addresses of the plurality of entries, and if an request address and an entry address are the same, outputting the entry address;

read register means for storing output of the pre-fetch address queue means;

second calculator means adding the specific value to the entry address of the read register means and outputting the result;

pre-fetch address register means for storing output of the second calculator means; and registration means for registering the outputs of the first and second calculator means in one of the plurality of entries of the pre-fetch address queue means as the pre-fetch address.

33. A pre-fetch control method that is adopted in a data processing apparatus with a cache memory unit, comprising:

registering an address value of a memory that has a possibility of being previously accessed;

comparing, in a pre-fetch request unit, a request for which an access was previously requested and the address value; and requesting, in a pre-fetch request unit, the cache memory unit to pre-fetch data, based on a result of the comparison.

* * * * *